US009858638B1

United States Patent
Blaivas

(10) Patent No.: US 9,858,638 B1
(45) Date of Patent: *Jan. 2, 2018

(54) CONSTRUCTION AND EVOLUTION OF INVARIANTS TO ROTATIONAL AND TRANSLATIONAL TRANSFORMATIONS FOR ELECTRONIC VISUAL IMAGE RECOGNITION

(71) Applicant: Alex Simon Blaivas, Draper, UT (US)

(72) Inventor: Alex Simon Blaivas, Draper, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/709,954

(22) Filed: Sep. 20, 2017

Related U.S. Application Data

(60) Continuation-in-part of application No. 15/642,836, filed on Jul. 6, 2017, which is a division of application No. 15/251,751, filed on Aug. 30, 2016, now Pat. No. 9,727,945.

(51) Int. Cl.
  *G06T 3/00* (2006.01)
  *G06K 9/62* (2006.01)

(52) U.S. Cl.
  CPC ............ *G06T 3/005* (2013.01); *G06K 9/6203* (2013.01)

(58) Field of Classification Search
  None
  See application file for complete search history.

(56) References Cited

U.S. PATENT DOCUMENTS

| 6,083,353 | A  | 7/2000  | Alexander, Jr. |
| 6,486,908 | B1 | 11/2002 | Chen et al. |
| 6,853,745 | B1 | 2/2005  | Jacobs et al. |
| 7,058,217 | B2 | 6/2006  | Thornber et al. |
| 7,236,630 | B2 | 6/2007  | Sato et al. |
| 8,670,621 | B1 | 3/2014  | Blaivas |

(Continued)

OTHER PUBLICATIONS

Bahri, C., Rowe, D., & Draayer, J. (2004). Programs for generating Clebsch—Gordan coefficients of SU(3) in SU(2) and SO(3) bases. Computer Physics Communications, 159(2), 121-143. doi:10.1016/j.cpc.2004.01.005. Retrieved Oct. 3, 2017.

(Continued)

*Primary Examiner* — Sumati Lefkowitz
*Assistant Examiner* — Carol Wang
(74) *Attorney, Agent, or Firm* — Morriss O'Bryant Compagni

(57) ABSTRACT

A spherical harmonic is defined which is an operationally optimal small finite subset of the infinite number of spherical harmonics allowed to exist mathematically. The composition of the subset differs depending on its position on virtual hemisphere. The subsets are further divided into small spherical tesserae whose dimensions vary depending on the distance from the hemispherical center. The images of the outside visual scenes are projected on the flat surface of the webcam and from there are read and recalculated programmatically as if the images have been projected on the hemisphere. rotational invariants are then computed in the smallest tesserae using numerical integration, and then invariants from neighboring tesserae are added to compute the rotational invariant of their union. Every computed invariant is checked with the library and stored there if there is no match. The rotational invariants are solely used for visual recognition and classification and operational decision making.

19 Claims, 17 Drawing Sheets

(56) References Cited

U.S. PATENT DOCUMENTS

| | | |
|---|---|---|
| 9,727,945 B1 | 8/2017 | Blaivas |
| 2004/0062419 A1 | 4/2004 | Roh et al. |
| 2006/0114252 A1 | 6/2006 | Ramani et al. |
| 2007/0183685 A1* | 8/2007 | Wada ................... G06K 9/32 382/285 |
| 2010/0046704 A1 | 2/2010 | Song et al. |
| 2011/0306413 A1 | 12/2011 | Bickerstaff et al. |
| 2014/0152566 A1 | 6/2014 | Safer |

OTHER PUBLICATIONS

Blaivas, A. (1976). Visual analysis: Theory of lie group representations. Mathematical Biosciences, 28(1-2), 45-67. doi:10.1016/0025-5564(76)90094-8. Retrieved Oct. 9, 2017.

Blaivas, A. S. (1976). Visual Analysis: Theory of Lie-Group Representations—II. Computations. Institute of Higher Nervous Activity and Neurophysiology, Academy of Sciences, Moscow, USSR, 485, 101-149. Retrieved Oct. 9, 2017.

Canterakis, N. (1999) 3D Zernike Moments and Zernike Affine Invariants for 3D Image Analysis and Recognition, Int. 11th Scandinavian Conference on Image Analysis, 85-93. Retrieved Oct. 9, 2017.

Holoborodko, P. (2011). Applied Mathematics and Beyond. Numerical Integration. Retrieved Oct. 9, 2017. Retrieved Oct. 9, 2017.

Joshi, N., Rotti, A., & Souradeep, T. (2012). Statistics of bipolar representation of CMB maps. Physical Review D, 85(4), 1-17. doi:10.1103/physrevd.85.043004. Retrieved Oct. 9, 2017.

Kazantsev, S. G. (2015). Singular value decomposition for the cone-beam transform in the ball. Journal of Inverse and Ill-posed Problems, 23(2), 173-185. doi:10.1515/jiip-2013-0067. Retrieved Oct. 9, 2017.

Mak, L., Grandison, S., & Morris, R. J. (2008). An extension of spherical harmonics to region-based rotationally invariant descriptors for molecular shape description and comparison. Journal of Molecular Graphics and Modelling, 26(7), 1035-1045. doi:10.1016/j.jmgm.2007.08.009. Retrieved Oct. 9, 2017.

Novotni, M., & Klein, R. (2004). Shape retrieval using 3D Zernike descriptors. Computer-Aided Design, 36(11), 1047-1062. doi:10.1016/j.cad.2004.01.005. Retrieved Oct. 9, 2017.

Rowe, D. J., & Bahri, C. (2000). Clebsch-Gordan coefficients of SU(3) in SU(2) and SO(3) bases. Journal of Mathematical Physics, 41(9), 6544-6565. http://dx.doi.org/10.1063/1.1286768. Retrieved Oct. 9, 2017.

Szapudi, I. (2004). Wide-Angle Redshift Distortions Revisited. The Astrophysical Journal, 614(1), 51-55. doi:10.1086/423168. Retrieved Oct. 9, 2017.

Varshalovich, D. A., Moskalev, A. N., & Khersonskii, V. K. (1988). Quantum Theory of Angular Momentum. World Scientific Publishing Co., Pte. Ltd., 141-144 and 160-164. doi:10.1142/0270. Retrieved Oct. 9, 2017.

Wang, H., Li, S., & Wang, Y. (2004). Generalized quotient image. Proceedings of the 2004 IEEE Computer Society Conference on Computer Vision and Pattern Recognition, 2004. CVPR 2004., 1063-6919. doi:10.1109/cvpr.2004.1315205. Retrieved Oct. 9, 2017.

Zhang, L., & Samaras, D. (n.d.). Face recognition under variable lighting using harmonic image exemplars. 2003 IEEE Computer Society Conference on Computer Vision and Pattern Recognition, 2003. Proceedings. doi:10.1109/cvpr.2003.1211333. Retrieved Oct. 9, 2017.

Zhang, L., & Samaras, D. (2006). Face recognition from a single training image under arbitrary unknown lighting using spherical harmonics. IEEE Transactions on Pattern Analysis and Machine Intelligence, 28(3), 351-363. doi:10.1109/tpami.2006.53. Retrieved Oct. 9, 2017.

* cited by examiner

Fig 4

Inverse pyramid
Associated Legendre Polynomials $P_l^m(\cos\theta)$

Fig 13  Two independent sets of Spherical Harmonics on 2-sphere with North Poles rotated in respect to each other

FIG 14. BIPOLAR SPHERICAL HARMONICS AS THE TOOL FOR BINOCULAR VISION

CONSTRUCTION AND EVOLUTION OF INVARIANTS TO ROTATIONAL AND TRANSLATIONAL TRANSFORMATIONS FOR ELECTRONIC VISUAL IMAGE RECOGNITION

RELATED APPLICATIONS

This application is a continuation-in-part of U.S. patent application Ser. No. 15/642,836, filed Jul. 6, 2017, which is incorporated herein in its entirety, which is a divisional of U.S. patent application Ser. No. 15/251,751, filed Aug. 30, 2016 (now U.S. Pat. No. 9,727,945 issued Aug. 8, 2017), which is incorporated by reference herein in its entirety, and is related to U.S. Pat. No. 8,670,621 (Blaivas), entitled USING INVARIANTS OF SPHERICAL HARMONICS TO ROTATIONAL AND TRANSLATIONAL TRANSFORMATIONS FOR IMAGE RECOGNITION IN INDUSTRIAL AND SECURITY APPLICATIONS, and incorporated herein in its entirety by this reference.

FIELD OF THE INVENTION

Embodiments of the present invention generally concern the construction and evolution of invariants to rotational and translational transformations for electronic visual image recognition. More particularly, at least some embodiments of the invention relate to systems, hardware, computer-readable media, and methods directed to the implementation and use of electronic visual recognition, and the use of such electronic visual recognition in various systems, devices, and applications.

BACKGROUND

In order for a visual recognition system to operate effectively, it must be able to generate and/or access reliable data concerning the surrounding environment. As well, a visual recognition system must be able to respond and adapt to changes, which can occur rapidly and unexpectedly, in the surrounding environment. However, typical visual recognition systems may not be well equipped to perform as needed.

Accordingly, it would be useful to provide systems and methods that can generate invariants of spherical harmonics which can be employed by a visual recognition system. As well, it would be useful to provide systems and methods that are capable of generating invariants of spherical harmonics from scratch. It would also be useful to provide invariants of spherical harmonics, such as in a library, to other systems and devices so that those systems and devices can employ visual recognition without the need for any training or conditioning. Finally, it would be useful to be able to perform visual recognition processes using only a limited set of spherical harmonics to generate invariants.

BRIEF DESCRIPTION OF THE DRAWINGS

In order to describe the manner in which at least some aspects of this disclosure can be obtained, a more particular and detailed description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which:

FIG. 4 discloses aspects relating to variability in Legendre polynomials;

DETAILED DESCRIPTION OF SOME EXAMPLE EMBODIMENTS

Figure 1:
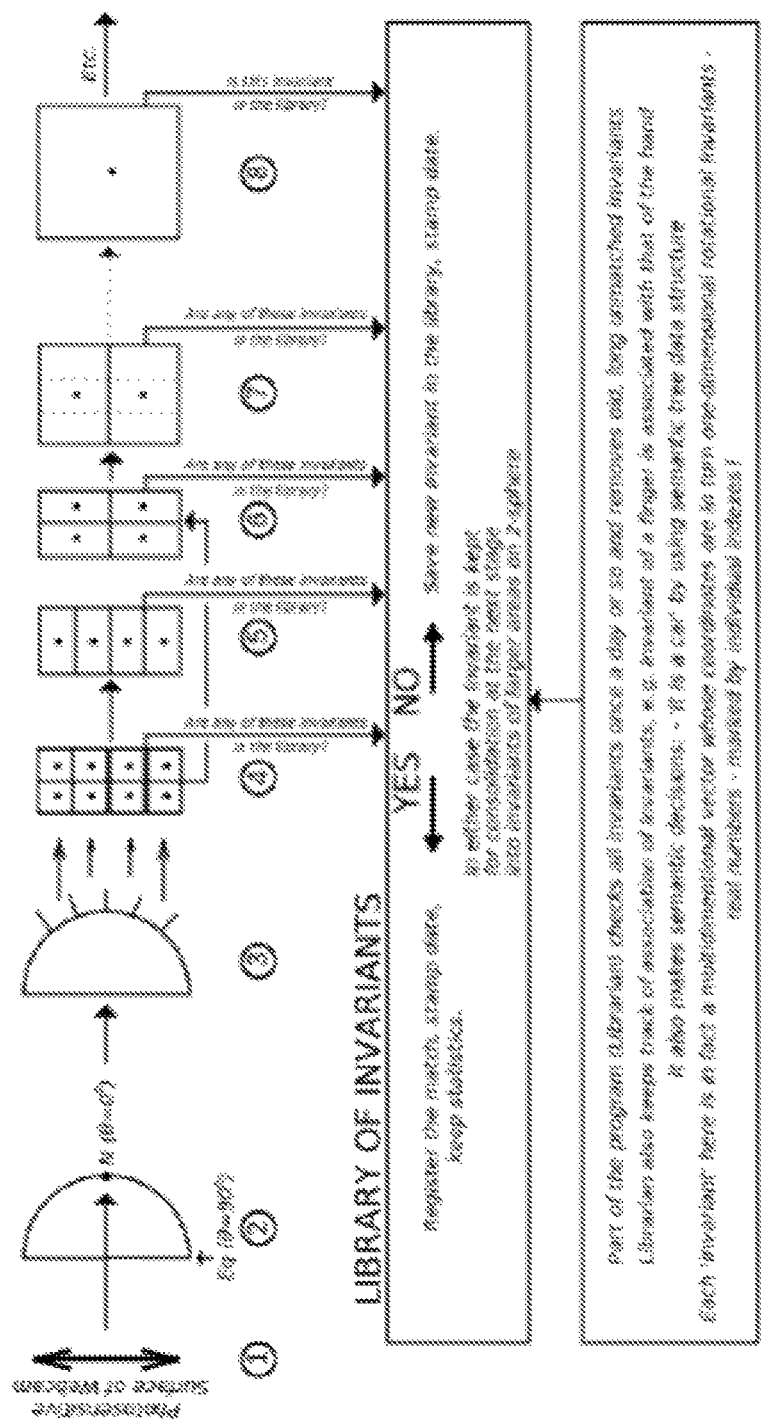
FIG. 1 is a flow diagram disclosing internalized computational environment shaped to perform all operations for efficient image recognition system.

Embodiments of the present invention generally concern the construction and evolution of invariants to rotational and translational transformations for electronic visual image recognition. More particularly, at least some embodiments of the invention relate to systems, hardware, computer-readable media, and methods directed to the implementation and use of electronic visual recognition, and the use of such electronic visual recognition in various systems, devices, and applications. Such visual recognition functionality may include recognition of one or more physical elements of static and/or dynamic operating environments, as well as creating a comprehensive description of the whole visual scenes with highlighting especially important and/or dangerous security configurations, and can be employed in a wide variety of applications, one example of which is fully-autonomous, or semi-autonomous, control of land-based vehicles or amphibious land/sea vehicles, robots in fire or explosion prone places, and war zones, although the scope of the invention is not limited to this example application and the disclosed technology is suitable for a variety of other applications as well, such as the examples disclosed in the application identified in the 'Related Applications' section of this application.

In more detail, a system can be created and implemented that is configured to generate invariants based on input concerning one or more physical scenes or physical environments. One example of such a system includes one or more cameras, such as a webcam or a video PC camera, for example. The camera or cameras can snapshot two dimensional, and/or three dimensional, information regarding one or more static and/or dynamic physical environments. Regardless of the type of physical environment involved, the one or more cameras can snapshot information and then upload the recorded data for processing, such as, for example, by a hardware processor and executable instructions of a computing device or a server. More particularly, the uploaded camera data can be used for generation of invariants relating to the physical environment whose attributes were recorded.

The image data received from the cameras can be virtually projected onto a virtual Hemisphere programmatically using the obtained digital input from the camera. A real world physical analog to the Hemisphere is a retina of an eye. In at least some embodiments, only a single set of spherical harmonics is needed to generate a set of invariants.

A coordinates library correlates the subdivision of the set of spherical harmonics with a respective set of generally rectangularly shaped elements of a surface of a Hemisphere. The size of the element varies according to its location on the sphere. Invariants, and specifically rotational invariants, can now be computed for each of the elements.

After the invariants are generated for the smallest visual elements (see FIG. 1 & FIG. 7), invariants can then be generated for larger elements by adding invariants of neighboring elements together. The generated invariants can then be stored. In general, use of the term 'invariant' reflects the fact that the invariants represent one or more details of a visual scene that remain the same, regardless of where the detail is located on the hemisphere. Multiple sets of invariants, each corresponding to a different timeframe, can be generated. Each timeframe or time interval can correspond to a respective change in the visual scene, such as when an object within the scene is moving.

Over time, some invariants will appear relatively more often than others and the frequency with which the invariants appear can be recorded. Invariants that appear on a recurring basis are considered as indicating the true representation of an object in the physical visual world, while invariants that do not regularly appear may be considered to be artifacts not representative of the object and which can thus be discarded after the passage of a certain amount of time.

The system will also provide for generalization of invariants illustrated by this example. At the initial stage of the operation, the vision system may calculate and store invariants describing, for example, 100 various individual automobiles. Although those individual invariants are important and must be kept, the system will also generalize features common to all of them and store an image of the automobile for subsequent classification and decision making.

After the library of invariants has been reduced down to a grouping of invariants that are considered to form a true representation of an object, or objects, those remaining invariants can then be used by a visual recognition system, examples of which are disclosed herein.

Advantageously then, at least some embodiments of the invention provide for creation of invariants from scratch, that is, from visual data gathered from an actual physical operating environment. As well, the invariants can be refined over time so that artifacts are removed, thus leaving a true representation of an object or environment. Moreover, the refined set of invariants can be uploaded to a device that consists of, or comprises, a visual recognition system in its native, original state with zero number of invariants in it, or alternatively to a system that has been exposed to different operating environments and which developed visual invariants pertaining to this different environment. Because the refined set of invariants fully represents, for example, an operating environment, or at least represents the operating environment at minimal acceptable level of detail, a device employing the invariants can quickly analyze an operating environment by extracting invariant information from the viewed environment and comparing the extracted information with the pre-loaded refined set of invariants, and then taking action accordingly.

As will be apparent from this disclosure, embodiments of the invention can be employed in a variety of specific applications involving visual recognition. Moreover, it will further be apparent from this disclosure that example embodiments of the invention are effective in solving various problems in the field of visual recognition, and/or in improving currently existing visual recognition systems, methods, and devices.

A. Decision Making

It should be understood that the disclosed system of visual recognition operating on the basis of the most economical representation of elements of the visual world via rotational invariants can be easily configured to operate as a decision maker, such as, for example, for a warning system of appropriate kind.

B. Example Operating Environments

In general, example embodiments of the invention can be employed in connection with data that corresponds to or describes static and/or dynamic physical environments. As employed herein, a static physical environment is one in which few or no visually perceptible changes occur over a defined period of time. A static physical environment can also be an environment in which one or more visually perceptible changes occur over a defined period of time, but those visually perceptible changes are ignored in the generation of invariants for that physical environment. For example, an airplane passing overhead is a transient event and may have no bearing on the physical environment for which invariants are to be generated. Thus, the passage of the airplane can be ignored, in some instances at least. Or alternatively such a relatively uncommon event like the passing of an airplane could represent the expected and desired occurrence that might trigger a decision to alert either a human observer, network or simply register a statistically significant happening.

On the other hand, a dynamic physical environment is one in which one or more visually perceptible changes occur over a defined period of time. One, some, or all, of the visually perceptible changes in a dynamic physical environment can be taken into account when generating invariants.

An example of such a visually perceptible change is an event that occurs repeatedly over time in a relatively predictable manner, such as the raising and lowering of a bridge for example.

C. Example Processes and Methods

In general, any of the disclosed methods and processes can take the form of instructions carried on a non-transitory storage medium and executable by, and/or at the direction of, one or more hardware processors and/or other computer hardware. Such non-transitory storage media and the processors or other hardware that execute the carried instructions are considered to be within the scope of this invention. As well, the disclosed processes may ascribe various functionalities to elements disclosed herein. However, such allocations of functionalities are presented only by way of example and, in other embodiments, those functionalities can be allocated differently. Thus, it should be understood that the scope of the invention is not limited to any particular allocation or performance of functions. Moreover, while some example methods and processes are concerned with the operation of vehicles in a physical environment, the scope of the invention is not so limited. Rather, such methods and processes can be used in any application or environment where visual recognition of a physical environment is needed and/or where one or more actions are identified and taken based upon such visual recognition.

The logistics of the operation require selected Spherical Functions corresponding to selected degrees l and orders m to be preloaded into a database and made available to the processor or processors in RAM on demand during executing a set of commands and the visual image located on virtual Hemisphere might be understood as interacting with the Spherical Harmonics. In more detail, the visual function (image) is expanded into a series of the spherical harmonics. This interaction results in a set of complex numbers referred to as coefficients of the expansion. The spherical harmonics each have two indices, which are integers, l and m. The indices are theoretically infinite in number, but on a practical level, a selection is limited to a relatively small number of the most informative such indices.

In some instances, no more than a single set of spherical harmonics is needed to generate invariants, discussed in more detail below, while in other embodiments, two or more sets of spherical harmonics can be employed. More particularly, a single set of functions, using the North Pole as the center of a Hemisphere on which the image is projected virtually, can be used. In other embodiments, two or more sets of functions, each with different respective North Pole positions, can be employed.

As used herein, the term 'invariant' embraces a sum of all members of the expansion of the visual function, or image, into the series of spherical harmonics having the same value of the index l. The value of the invariant is a real number that is invariant, that is, does not change, when the projected image is rotated on the hemispherical surface. Thus, a set of invariants corresponding to all of the available indices l constitutes a multi-dimensional vector, namely an n-tuple, that is invariant to rotations. Put another way, an invariant is a point or vector in an N-dimensional vector space, where the axes are real numbers. Due to the nature of rotational invariants, they will represent details of the projected visual scene regardless of where the details are located on the hemispherical surface.

In general, determination of the invariants is based upon the values of the index l. The determination of invariants can take the form of a multi stage process that involves multiple hierarchical levels of invariant computation. Moreover, the process of determining invariants can be performed in reference to time quanta. That is, determination of a set of invariants can be performed repeatedly in each of a number of different time intervals, for example, to accommodate changes to elements of a visual scene, or to the entire visual scene itself, that might be experienced as a device moves in a physical environment. Thus, the initial determination of invariants for each of the elements of the projected image can be the first stage of a multi stage process.

Similar processes can be performed for successively higher levels to generate invariants for larger and larger portions of the projected image. All of the levels of an invariant determination process can be performed within a single slice or interval of time. Thus, while multiple invariant determinations on various respective levels can be performed, those multiple determinations may be considered as constituting a single process performed within a particular time interval. Successive and/or prior processes performed in other time intervals can similarly include multiple determinations at various levels.

Over time then, as invariants continue to be generated for the projected image, invariants that meaningfully correspond to the physical object or environment to which the projected image corresponds will be reinforced and retained as being representative of the physical object or environment, while invariants that lack such correspondence will not be reinforced and will eventually be automatically deleted and/or marked as lacking significance. In some embodiments, these designations of invariants can be implemented in connection with a measurement of the frequency with which an invariant recurs. Thus, regularly recurring invariants will be retained, while irregularly or rarely occurring invariants may be rejected.

D. Aspects of Further Embodiments

With attention now to FIGS. 1-17, details are provided concerning some example embodiments for the construction and evolution of invariants to rotational and translational transformations for electronic visual image recognition.

When a functioning visual system observes outside objects, in overwhelming majority of cases, projections of those objects on a photosensitive surface do not appear stationary and constantly shift from one location to another. It is also safe to assume that the most appropriate surface for such input device is a hemisphere. Intuitively, we presume that the projections of the objects while moving remain the same and are thus easily identified. In reality, however, such identification cannot be assumed to be trivial and a mechanism must be described that guarantees proper identification of constantly moving projections.

The problem is properly mathematically solved if a technical system is designed to compute rotational invariants which are used as descriptors of the visual world. The task of computing invariants is greatly simplified if the visual images are projected on a hemisphere. For the lack of a web-camera with hemispheric photosensitive surface, although such systems might be made available in the future, the "projection" is performed virtually in a computer or a server after the image is digitally read from a web-cam. The images then are assumed to be functions in the Hilbert space, and are expressed via linear combinations of special orthonormal (on the sphere) functions, Spherical Harmonics, that serve as an irreducible functional basis in the Hilbert space.

More accurately, one can say that the light intensity functions on the hemisphere representing projections of images from the outside world, always considered behaving mathematically well, are expressed as sums of Spherical Harmonics multiplied by expansion coefficients (see formula [1] below). Among other things, embodiments of the invention embrace a system that is capable to generate rotational invariants of the Spherical Harmonics from scratch, channel the evolution of such invariants in a highly coherent cognitive tree database, and provide seed invariants for dissemination among identical retail computer visual systems. The function (image) on the hemisphere is thus expressed as:

$$f(\theta,\varphi)=\Sigma_{l=0}^{\infty}\Sigma_{m=-l}^{m=l} f_l^m Y_l^m(\theta,\varphi). \quad [1]$$

where integer index l is the degree and integer m is the order and $Y_l^m(p)$ are the Spherical Harmonics:

$$Y_l^m(\theta,\varphi)=N_l^m e^{im\varphi} P_l^m(\theta,\varphi). \quad [2]$$

$N_l^m$ is a normalization factor, $$e^{im\varphi}=\cos(m\varphi)+i\sin(m\varphi) \quad [3]$$

is a complex exponent and $f_l^m$ are the expansion coefficients:

$$f_l^m=\int_0^{2\pi}\int_0^{\pi/2} f(\theta,\varphi) Y_l^m(\theta,\varphi)\sin\theta d\theta d\varphi \quad [4]$$

and $P_l^m(\cos\theta)$ [5]

is Associated Legendre Polynomial (ALP). In formula [4] the upper limit of integration over angle θ is 2, not π because we operate on a Hemisphere. Small lateral movements of the elements of the visual scenes (translations) will project on the Hemisphere as rotations with sufficient accuracy if they are not excessive.

In reality, the summation over the degree l (formula [1]) does not go to Infinity but is limited by some large number N and it also does not start from 0 for our purposes but from some number n<N. Coefficients with negative order m have a simple relation with those with positive order m and therefore their time consuming calculation can be avoided.

Also as will be seen, it is possible to represent a visual image with sufficient accuracy while the system ignores some degrees n≤l≤N as well as some orders m, which is important to speed up computations. In some calculations, the angles θ and φ will also be range limited. It is important to note that this limited selection is not dynamic. That is, it is performed once and for all while constructing a prototype, and appears static in nature. In embodiments of the invention, the set of indexes l and m are preloaded in the computer memory before the start of the operations however the resulting selection of the indexes differs in different hemispherical zones (see FIGS. 6 & 7).

The nature of the Visual Image on the Hemisphere impacts the choice of individual degrees l and orders m needed for sufficiently accurate description of visual scenes. If the Image is flat and there are few details, or in other words the gradients across the Image are small, most of the coefficients with higher degrees l will end up negligibly small. In order to describe typical images available in our surroundings, with a plethora of details and good contrasts, degrees l in the vicinity and often in excess of 600 are needed in the area around the North Pole of the Hemisphere (see FIG. 12). The period of the trigonometric functions important for discrimination in the azimuthal direction (see formula [3]) are calculated with this formula, $$T=2\pi/m \quad [6]$$

and the "waves" of Associated Legendre Polynomials important for discrimination along the meridional direction are:

$$2\pi/(l+0.5) [7]$$

Note that in the latter case, the wavelength of ALP does not depend on order m. The optimal situation presents when the dimensions of details to be described on the Hemisphere match the period T in azimuthal direction [6] and the wavelength of the Legendre Polynomials in meridional direction [7].

FIG. 1 discloses aspects of the principle of some example embodiments of the invention. At stage (1) the Image is available physically on the flat surface of a Web-cam or a photo-camera with or without a zoom lens. It is read from there and recalculated in such a way that in the virtual space of the computer or server, it is projected on the Northern Hemisphere of the 2-sphere. The North Pole of the Hemisphere and the Equator are shown symbolically on stage (2) of FIG. 1. Point N (θ=0) is both the Center of the whole Visual Field as well as the North Pole for the set of the Spherical Harmonics defined on it. An identical system can be built using the opposite, Southern Hemisphere, however herein we will be talking about Northern Hemisphere as a representative of both for convenience only.

Figure 2:
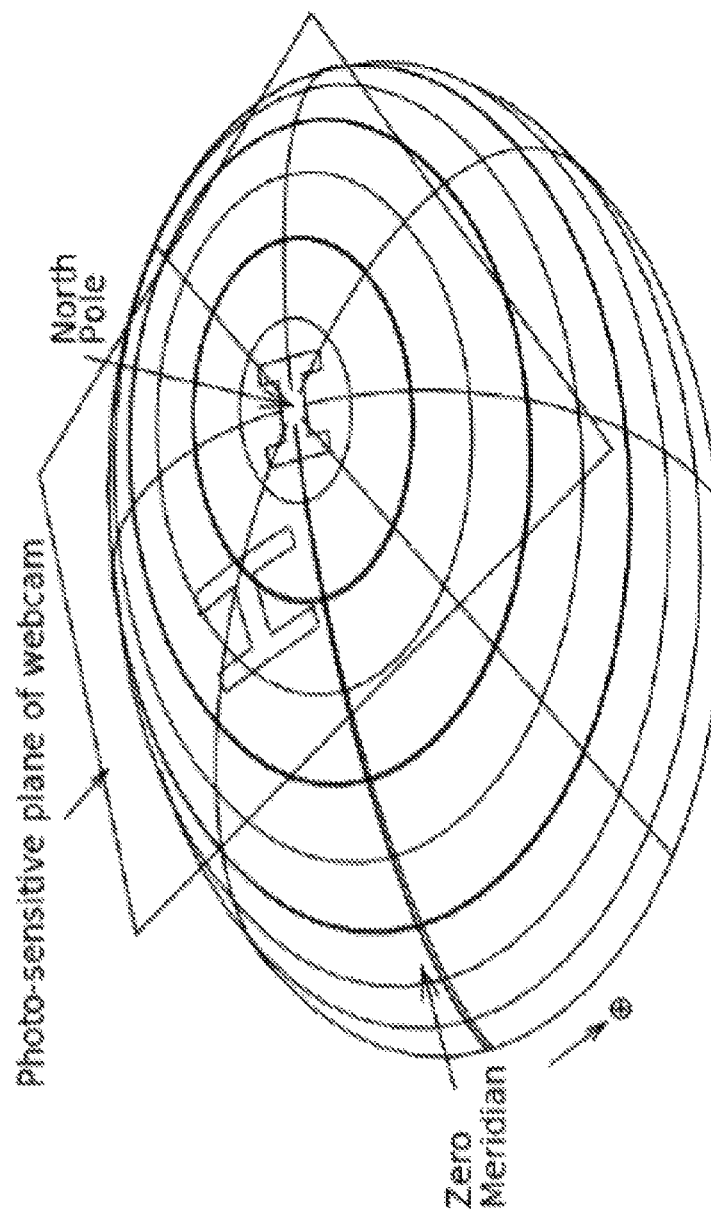
FIG. 2 discloses aspects of a relation between a physical input photosensitive plane (e.g. a webcam) and a virtual hemispherical projection surface.

FIG. 2 shows the relationship between the web-cam and the Northern Hemisphere of the virtual 2-sphere in a 3-D projection mode. It is assumed that the whole process of image fragmentation, calculating the invariants, image recognition and library storage, if needed, takes place within a time quantum e.g. 100 milliseconds and takes place in a multiprocessor computer or server with parallel computing capabilities. The image is fragmented in the virtual space of the computer or server according to orientation and positions of zeros of Spherical Harmonics.

Figure 3:
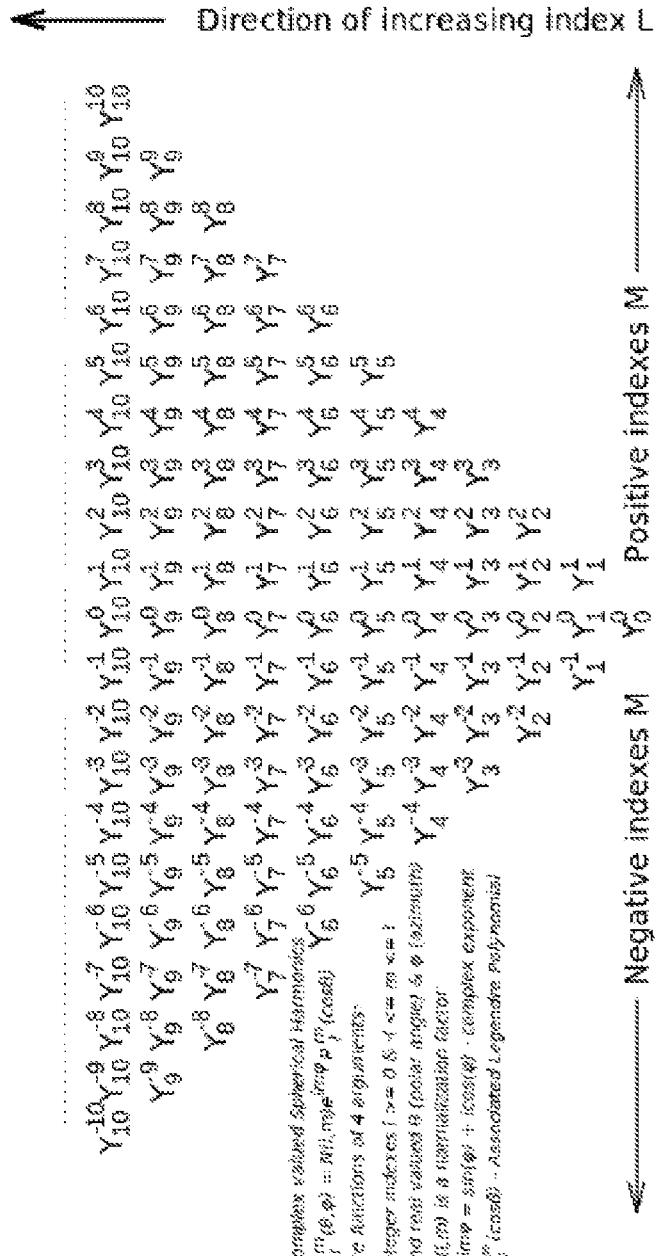
FIG. 3 discloses aspects relating to variability in spherical harmonics.
Figure 5:
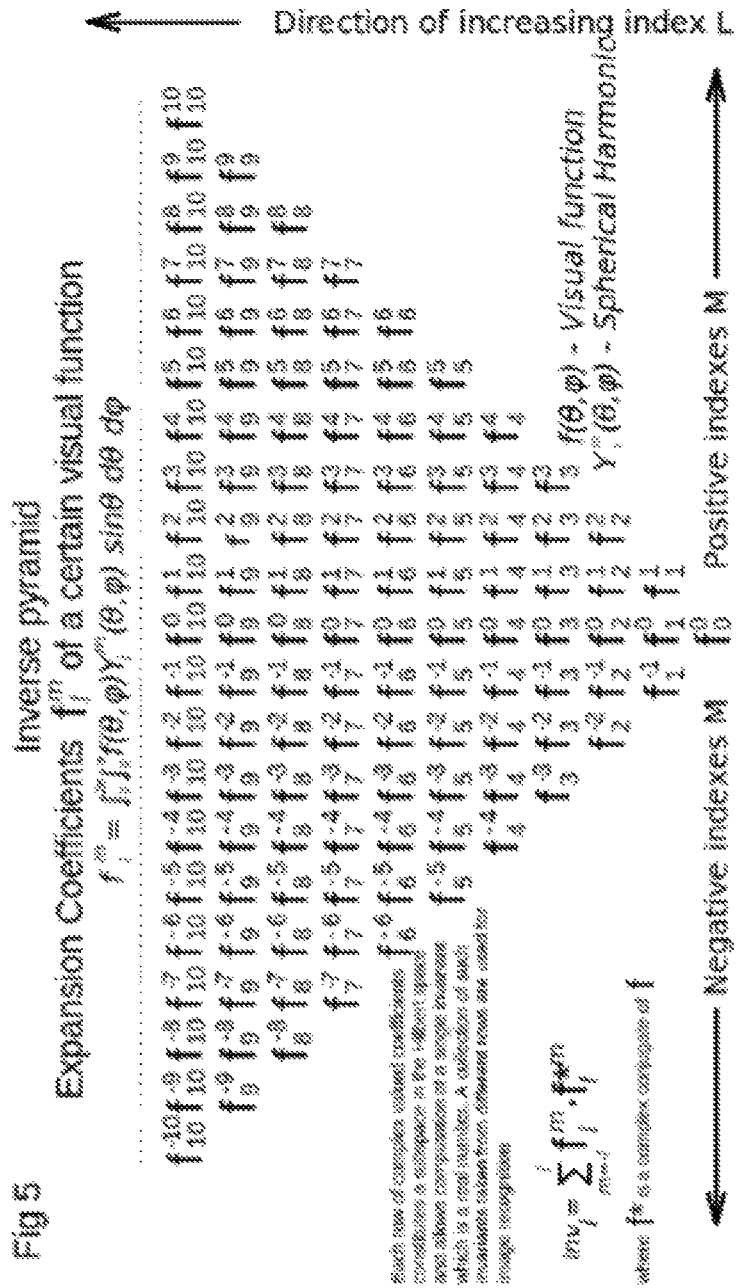
FIG. 5 discloses aspects relating to variability in expansion coefficients of an example visual function.

A diagram of Spherical Harmonics in a form of inverse pyramid is shown on FIG. 3, inverse pyramid of ALPs of lower indexes l is shown on FIG. 4 and corresponding Expansion Coefficients of a hypothetical visual function on FIG. 5. FIG. 5 also shows the formula to calculate invariants to rotational transformations which are scalar products.

$$J_l=\Sigma_{m=-l}^{m=l} f_l^m f_l^{m*} \quad [8]$$

where $f_l^{m*}$ is the complex conjugate of $f_l^m$.

If we limit ourselves to a certain selection of degrees n≤l≤N, we will end up with ℌ =N−n+1 invariants. We will adopt a language that each invariant is marked by a corresponding index l. These invariants are real numbers and one can say they are one-dimensional invariants. The collection of ℌ invariants might be considered one multi-dimensional invariant, or multi-invariant, which is a vector in Euclidean real-dimensional space ℝ ℌ, and they will be used for image characterization and recognition.

If some non-informative degrees l are dropped from the set of ℌ then the dimensionality of the multi-invariant will be correspondingly reduced. It is important to note that the vision system computes the expansion coefficients (see formula [4]) but never restores the original image (see formula [1]). Instead, the vision system computes rotational invariants using formula [8]. The computed invariants are being used to represent the images in question.

For the description of realistic visual images much higher degrees l are needed. Examining such diagrams helps in determination of the set of Spherical Harmonics that are practically useful for describing outside visual world. Some example diagrams are addressed immediately below.

Figure 6:
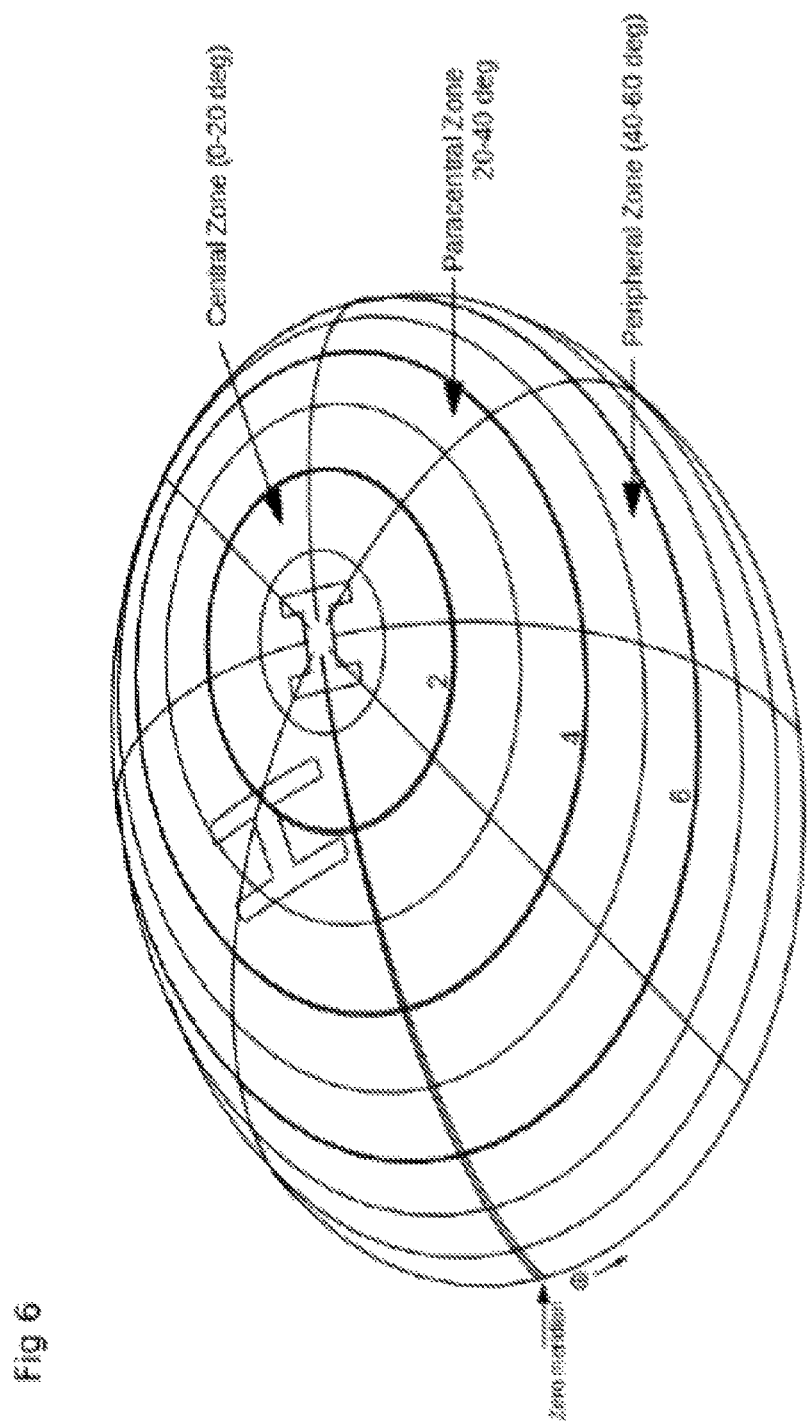
FIG. 6 discloses an example configuration of various functional zones on a hemispherical surface.

First, we need to take into account the distribution of visual acuity over the 2-hemisphere. FIG. 6 shows the North Hemisphere of the 2-sphere with two letters H projected and a set of meridians and parallels. The latter are drawn every 10°. Thus the angular distance between the North Pole and parallel number 2 is 20°. It is clear that the center of the virtual Hemisphere around the North Pole will have to deal with smaller details and the periphery with larger angular details. We've divided the Northern Hemisphere into 4 areas: {(0°,20°), (20°,40°), (40°,60°) and (60°,90°)}. The Central Zone should have components of the Spherical Harmonics (complex exponent in azimuthal direction and ALPs in meridional direction) with such degrees l and orders m that will provide maximum resolution. The Para-central Zone will need both functions with lower degrees and orders (indexes). And the Peripheral Zone will need even lower indexes.

Figure 7:
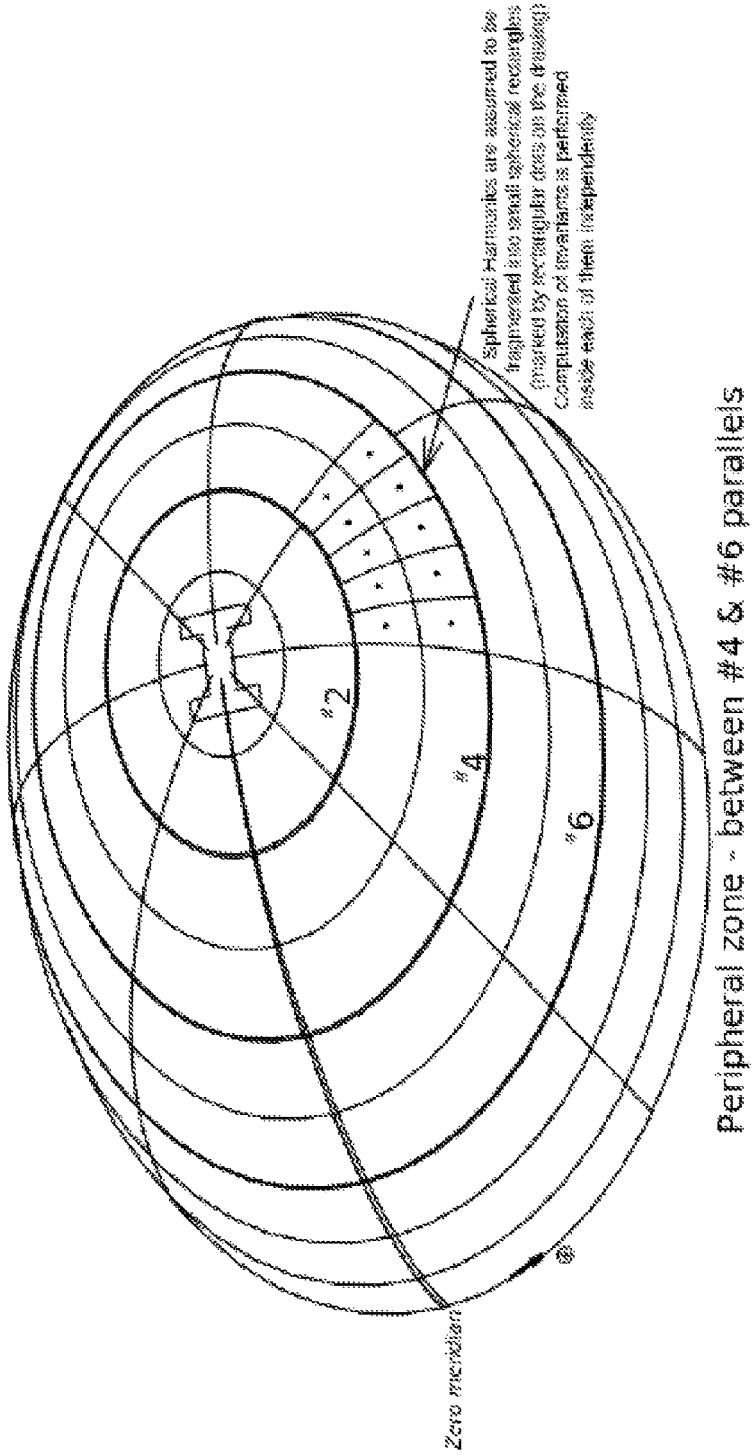
FIG. 7 discloses an example configuration of various circular zones on a virtual 2-hemisphere with an example of a part of a spherical harmonics function divided into a few small functional rectangles.

At least some example embodiments of the invention also presuppose that the whole virtual Northern Hemisphere of the 2-sphere is divided into small rectangles (tesserae) shown on FIG. 7 and the calculation of the Expansion Coefficients of visual images and corresponding invariants takes place first in such rectangles. The size of such spherical rectangles varies with the distance from the North Pole. They are the smallest in Central Zone, larger in Para-central Zone and even larger in Peripheral Zone.

As shown in FIG. 1, the system examines the "smallest" invariants by trying to find a match for them in the Library of Invariants (stage 4) and if no match is found these invariants are stored in the Library at the corresponding level. Then at the next stage the invariants calculated in two adjacent smallest rectangles are added together (stage 5 and 6). Mathematically the additivity can be shown as follows.

Particularly, assume that we have experimental light intensity (visual) function $f(\theta,\varphi)$ defined on two adjacent smallest rectangles. We can also assume that we can express experimental light intensity functions in each adjacent smallest rectangles as $f_1(\theta,\varphi)$ and $f_2(\theta,\varphi)$. It will also be assumed, for the purpose of this particular demonstration, that the visual function outside the area of combined two smallest rectangles is zero. Each of the above three functions can be expressed through their corresponding expansion coefficients as:

$$f_1(\theta,\varphi)=\Sigma_{l=0}^{\infty}\Sigma_{m=-l}^{m=l}f_l^m Y_l^m(\theta,\varphi) \quad [9]$$

$$f_2(\theta,\varphi)=\Sigma_{l=0}^{\infty}\Sigma_{m=-l}^{m=l}g_l^m Y_l^m(\theta,\varphi) \quad [10]$$

$$f(\theta,\varphi)=\Sigma_{l=0}^{\infty}\Sigma_{m=-l}^{m=l}q_l^m Y_l^m(\theta,\varphi) \quad [11]$$

We then fix one particular degree $l_0$, which defines a subspace in the Hilbert Space of Spherical Harmonics, and compute invariants in two adjacent smallest rectangles, and their union:

$$J_1=\Sigma_{m=-l_0}^{m=l_0} f_{l_0}^m f_{l_0}^{m*} \quad [12]$$

$$J_2=\Sigma_{m=-l_0}^{m=l_0} g_{l_0}^m g_{l_0}^{m*} \quad [13]$$

$$J=\Sigma_{m=-l_0}^{m=l_0} q_{l_0}^m q_{l_0}^{m*} \quad [14]$$

As a consequence of the linearity of the system and orthogonality of the Spherical Harmonics, the additivity of invariants is preserved:

$$J=J_1+J_2 \quad [15]$$

The boundaries of such rectangles are naturally assumed to coincide with some zeros of the Associated Legendre Polynomials along some parallels and zeros of components of the complex exponent functions, cosine and/or sine trigonometric functions, along some meridians. It is assumed that a few waves of either function are contained in each spherical rectangle. Further details will now be provided concerning some example functions.

Figure 8:
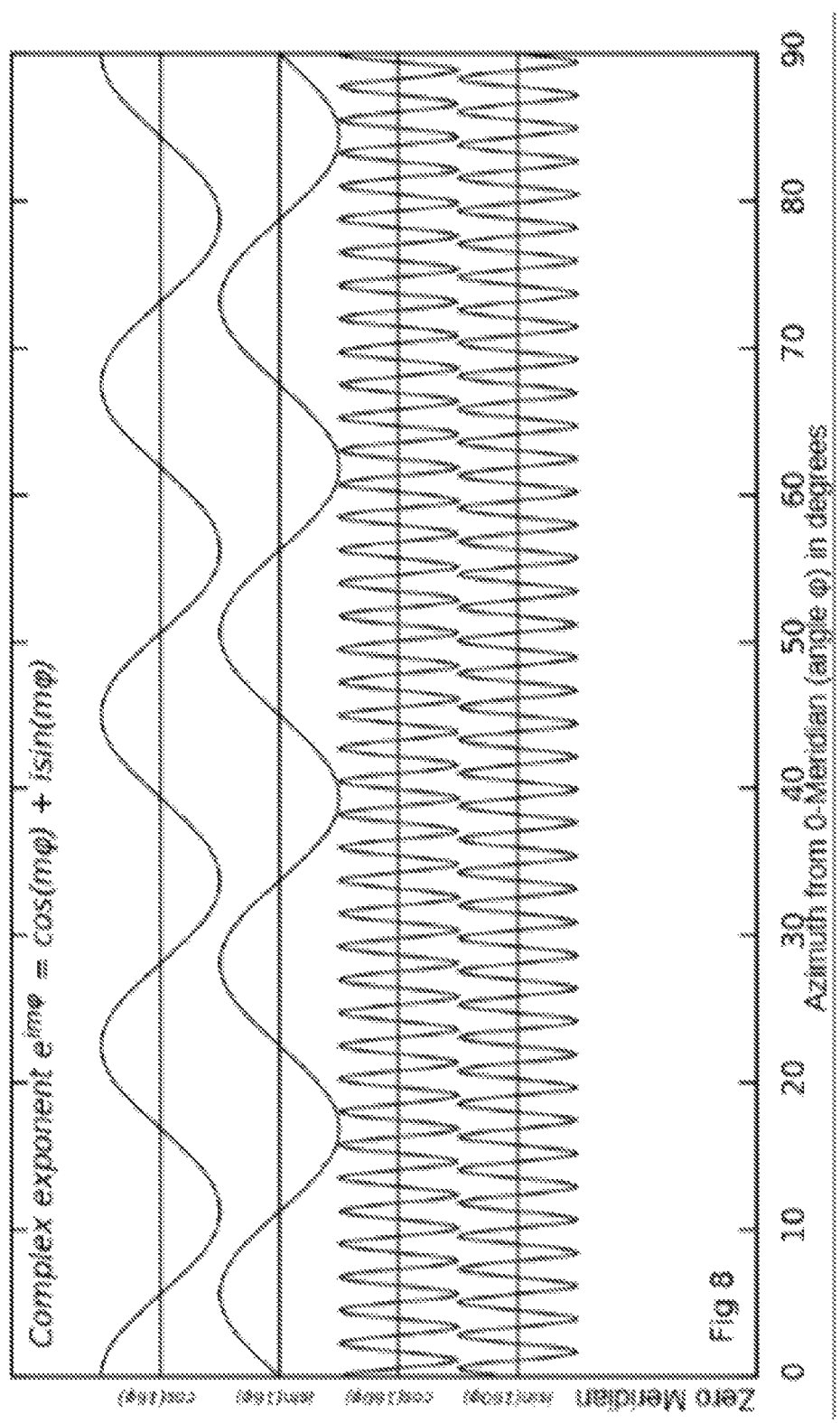
FIG. 8 discloses an example complex exponent with two values of index m.

FIG. 8 shows the Complex Exponent (formula [3]) with two values of index m, m=16 and m=160. One can trace such functions while moving in the direction of any parallel on 2-sphere with Spherical Harmonics defined on it. It is clear that such functions are defined on each parallel (a full circle) of the Hemisphere and their usefulness for detail discrimination depends on their position on the sphere. If we take an exponent function with index m very close to the North Pole, the waves will be close enough to "respond" to very small details and produce expansion coefficients which are meaningful. If we move away from the Center of the overall visual field (the North Pole), larger indexes m will be needed to accomplish a similar task.

Figure 9:
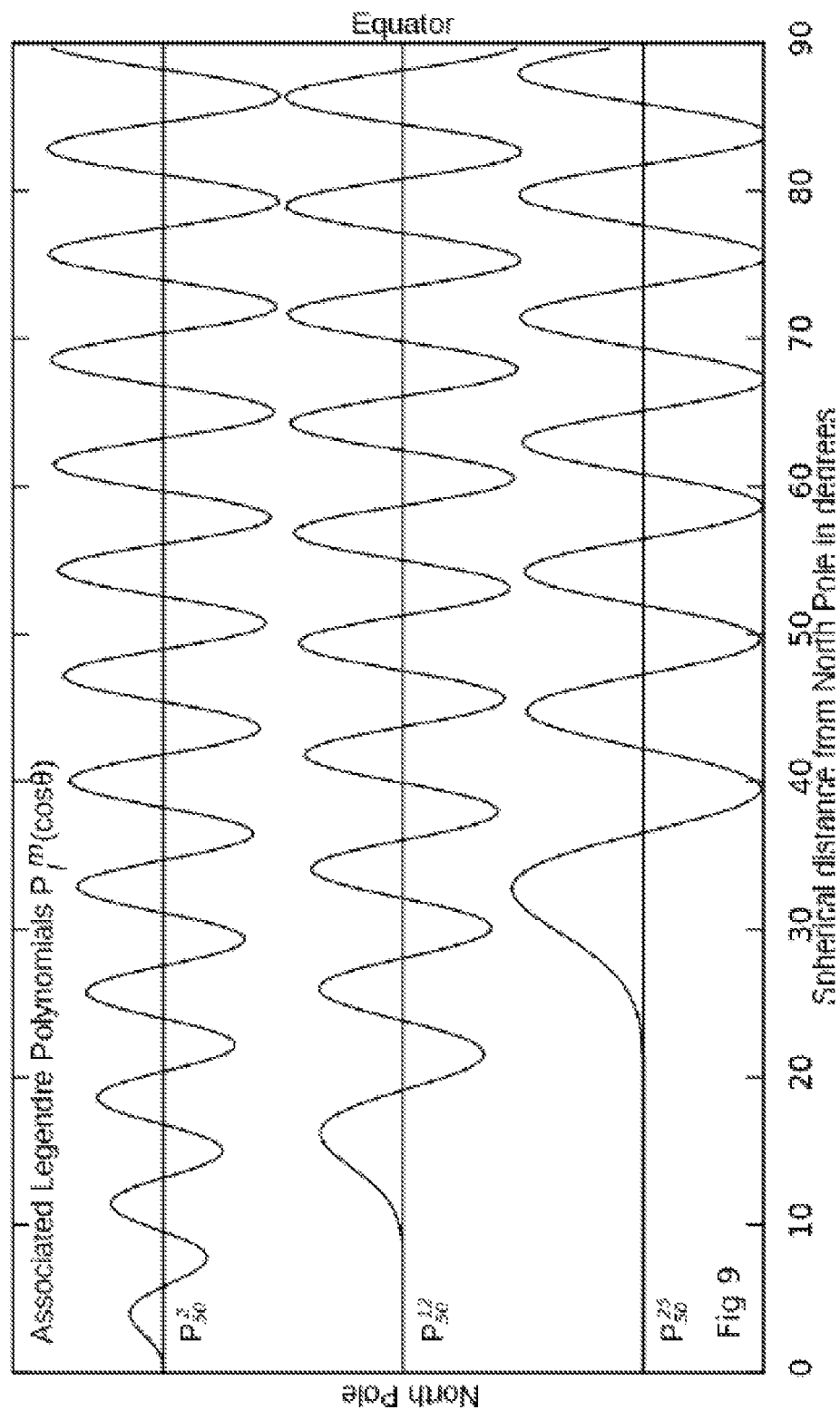
FIG. 9 discloses three fully normalized Associated Legendre Polynomials (ALP) with the same degree and different orders.

FIG. 9 shows three fully normalized ALPs with the same degree l=50 and different orders m: m=2, m=12, and m=25. One can see that an increase in the value of order m increases the length of the portion of the polynomial that is infinitesimally small as compared with the "regular" values at larger angles. For the polynomial $P_{50}^{12}$ this flat area is almost 10°. For the order m=25 this flat area is more than doubled. This means that if we decided to use a polynomial with degree l=50 in the vicinity of the North Pole, in Central Zone, we can neglect orders m>5 because the computed expansion coefficients will be too small anyway. It must be kept in mind that we compute expansion coefficients and corresponding invariants "locally," in rather small areas on 2-hemisphere, at the first stage.

Figure 10:
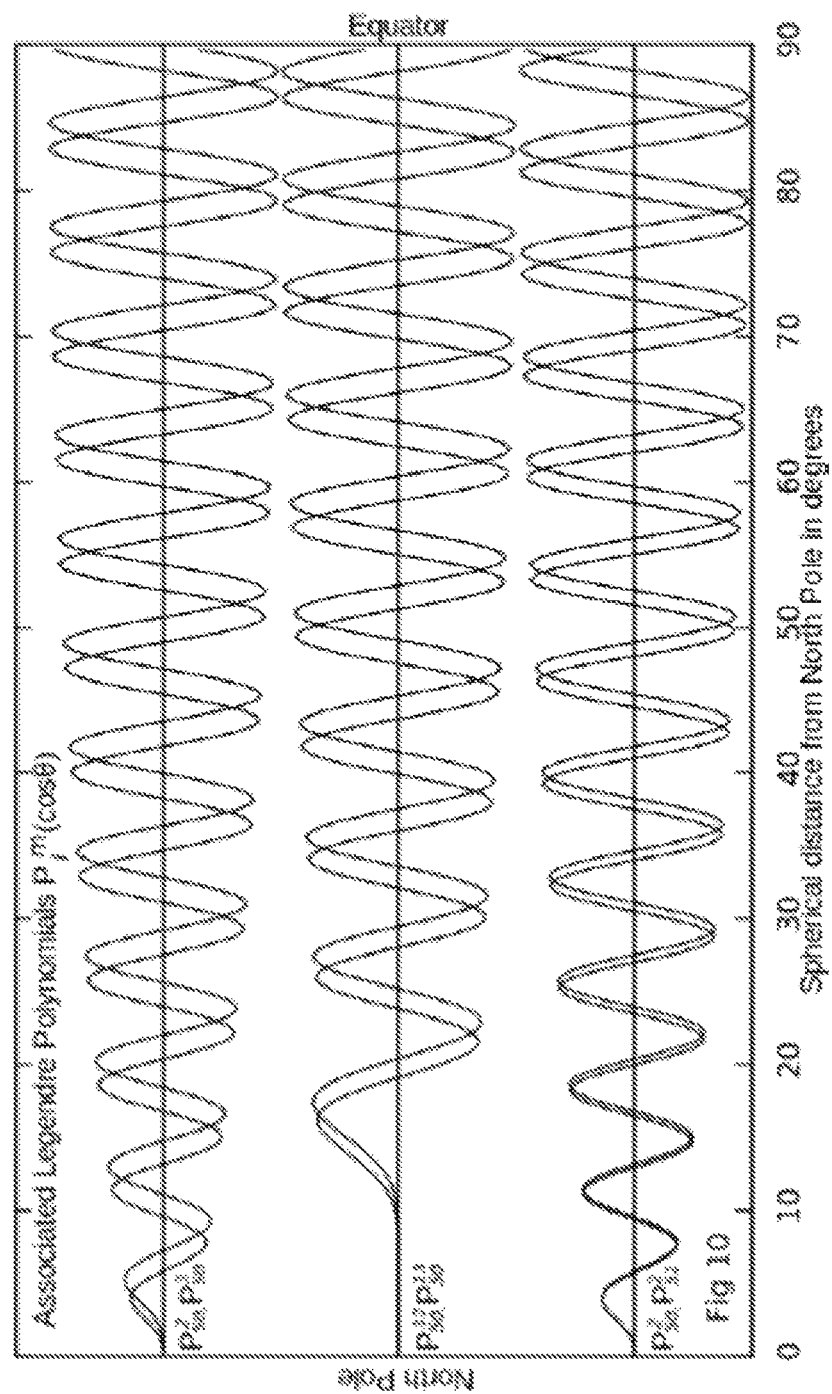
FIG. 10 discloses a collection of six fully normalized Associated Legendre Polynomials which are paired for comparison.

FIG. 10 shows a collection of six fully normalized Associated Legendre Polynomials which are paired for comparison $(P_{50}^2, P_{50}^3)$, $(P_{50}^{12}, P_{50}^{13})$ and $(P_{50}^2, P_{51}^2)$. One can see that with degree l=50 small variations in order m cause considerable phase shift in ALPs, however, a small variation of degree l does not change the phase significantly in the area around the North Pole $(P_{50}^2, P_{51}^2)$. This latter observation tells us that in a certain angular range some degrees l might be either ignored or the invariant for index l can be used also in lieu of neighboring l+1 or l−1 invariants because we will integrate in small spherical rectangles.

Figure 11:
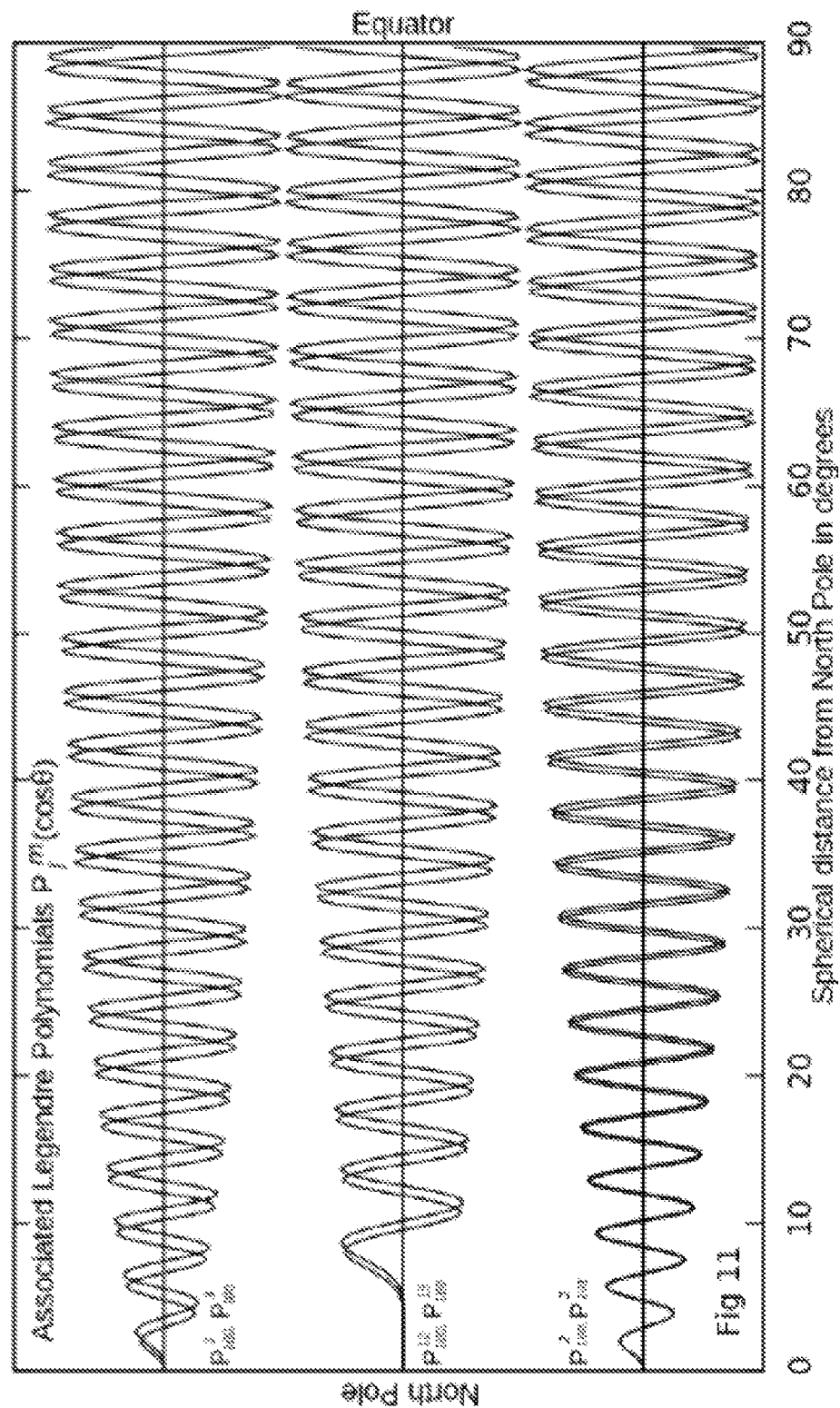
FIG. 11 discloses a collection of six fully normalized Associated Legendre Polynomials which are also paired for comparison.

FIG. 11 shows a collection of six fully normalized Associated Legendre Polynomials which are also paired for comparison. The top pair in FIG. 11 is $(P_{100}^2, P_{100}^3)$. We can see that there are waves of these two functions close to the North Pole. The middle two functions $(P_{100}^{12}, P_{100}^{13})$ have degree l=100 and orders m=12 and m=13 for comparison. We can see that higher orders m created flat areas near the North Pole. Therefore, such orders cannot be used for calculation of invariants in this angular area. The lowest two functions have "adjacent" degrees l=100 and l=101 and identical order m=2 $(P_{100}^2, P_{101}^2)$. It can also be seen that in a wide range around the North Pole approximately from 0° to almost 20° which coincides with the Central Zone in our definition, the last two Polynomials are almost identical. This picture suggests that we can skip some degrees l when we enter area of much higher degrees l, because they may produce near identical invariants or alternatively l-marked invariant can be used also in lieu of l−1 and/or l+1 invariants.

Figure 12:
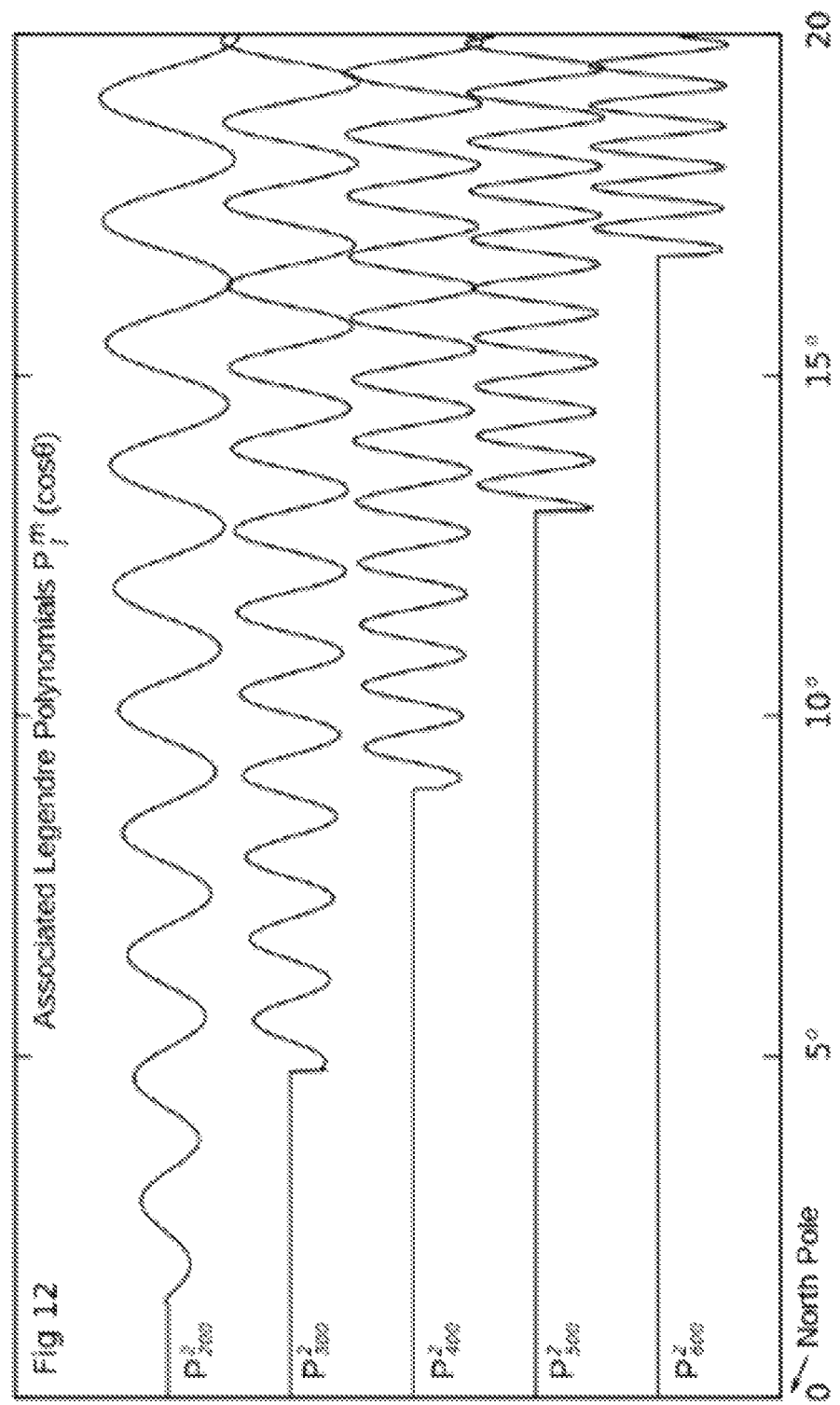
FIG. 12 discloses a further collection of Associated Legendre Polynomials for comparison.

Now we will see how a significant increase in the value of the degree l affects the shape of the Polynomials. FIG. 12 compares five polynomials. Order m=2 is identical for all of them. Degrees l are chosen from the set: {200, 300, 400, 500, 600}. Those polynomials are fully normalized and their values do not exceed 1.0. We can see that even when the degree l=200, the waves of the Polynomials might be too coarse to describe fine details of the visual image. Higher degrees l are needed. The problem here, however, is that the increase in the degree l causes the flat area to expand significantly and such polynomials, if positioned around the North Pole at the Center of the whole Visual View, will be useless for computation of expansion coefficients of the fragments of the Image located around the North Pole.

Figure 13:
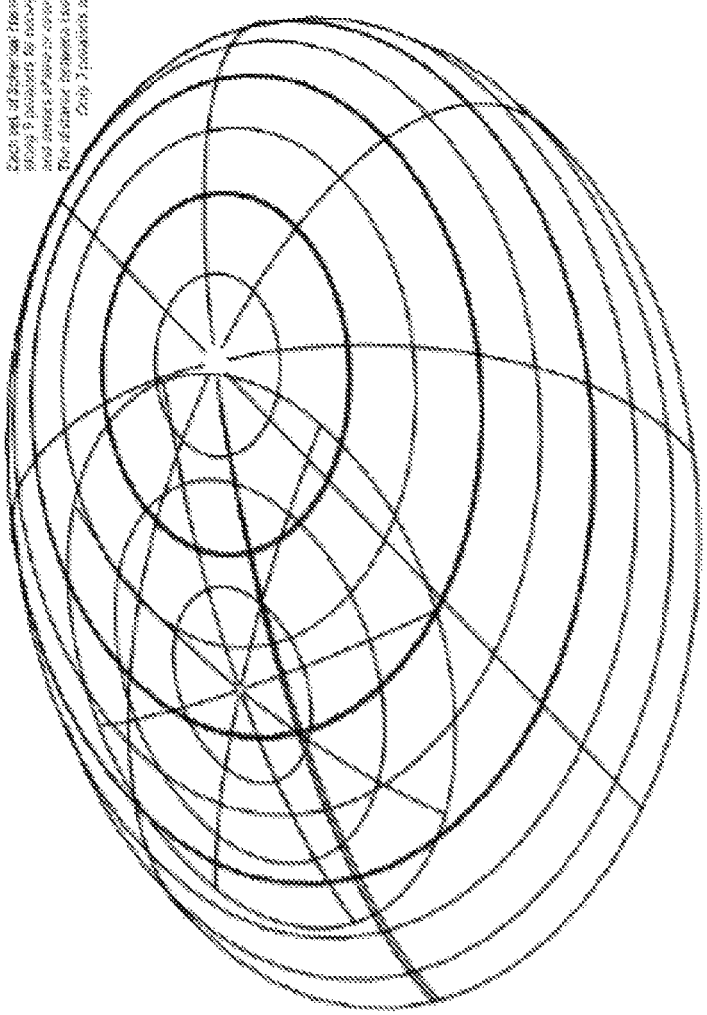
FIG. 13 discloses two independent sets of spherical harmonics on a virtual 2-hemisphere with North Poles rotated with respect to each other.

This problem can be resolved however by rotating a set of Spherical Harmonics with high valued degrees l away from the North Pole through Tait-Bryan angles $\alpha$, $\beta$, and, $\gamma$ to expose the central area around the Center of the Visual Field to meaningful wavelength. FIG. 13 shows such a situation, and comparison with the Polynomial $P_{600}{}^2$ on FIG. 12 which explains why the shift will be effective, however, it will be appreciated that more than one such shifted set might be needed.

In reference to FIG. 13 and the idea of using shifted (rotated) Spherical Harmonics sets, each set may be considered to be made from the central Spherical Harmonics set after a rotational Operator $\Re(\alpha,\beta,\gamma)$ is applied with $\alpha$, $\beta$, $\gamma$ being Tait-Bryan angles, where a is a rotation around the axis X, $\beta$ about the axis Y and $\gamma$ around the axis Z (roll, pitch, and yaw). Ref [1], identified below, presents formulas for recalculating the point values $Y_l^m(\theta,\varphi)$ of the rotated Spherical Harmonics from the "stationary" ones which will allow to recompute the expansion coefficients as well if needed.

Now we will consider again the Flow Chart Diagram of FIG. 1. The Image is read from the flat surface of the Web-cam (stage 1) and programmatically transformed as if it were projected to the Northern Hemisphere of the 2-sphere (stage 2) to take advantage of identifying images with the help of their rotational invariants. The image is then fragmented into small Spherical Rectangles whose boundaries coincide with some zeros of ALPs along spherical parallels, and sine or cosine trigonometric functions along meridians (stages 3 and 4). The positions of all rectangles are fixed. The images are then "expanded," in all smallest such rectangles, into the sets of Spherical Harmonics with such degrees l and orders m that provide maximum meaningful values for the expansion coefficients. The Euclidean invariants are then computed using the expansion coefficients.

At this stage, the Euclidean invariants which are vectors in n-dimensional vector space with axes that are real numbers are compared with those stored in the Library in search of a match. If there is no match such invariants are stored in the Library with the date stamped ("NO" direction on FIG. 1). If there is a match such invariants might be needed for image recognition at a higher level. The higher level means the second operation whereas the invariants computed in the smallest neighboring rectangles are added together to provide invariants of the larger visual rectangles. The fact of the match is registered and the date stamped ("YES" direction on FIG. 1). Only the last dates are saved, thus new dates are superimposed on the old ones, however, a counter of matches keeps the overall number of matches preserved. Each Invariant (a multi-vector) has a set of associated counters which keeps track of semantic associations between neighboring invariants. For example, a multi-invariant for an index finger would be associated with the thumb and/or the hand.

In either case (match, or no match), these invariants are kept for consolidation at higher levels: 5 and 6. At level 5, the two adjacent rectangles in azimuthal direction are virtually joined together and their union invariants are computed via expression [15]. At the same time two adjacent Spherical Rectangles are joined in the meridional direction (stage 6). Each time the Library is questioned for a possible match. The consolidation continues at the subsequent stages which results in invariants of still larger parts of the visual image.

On a practical level the invariants being multi-vectors in Euclidean vector space, $\mathbb{R}\,\mathfrak{H}$, cannot be expected to be matched with absolute precision. Some tolerance is introduced to make the matches approximate. After a certain period of exposure to a particular situation, perhaps a street corner or an airport waiting room, to name a few illustrative examples, the collected invariants may be programmatically uploaded into a similar computer system that has never had any similar exposure. Thus, a retail operation of producing image recognition systems of similar designation may be easily arranged.

Figure 14:
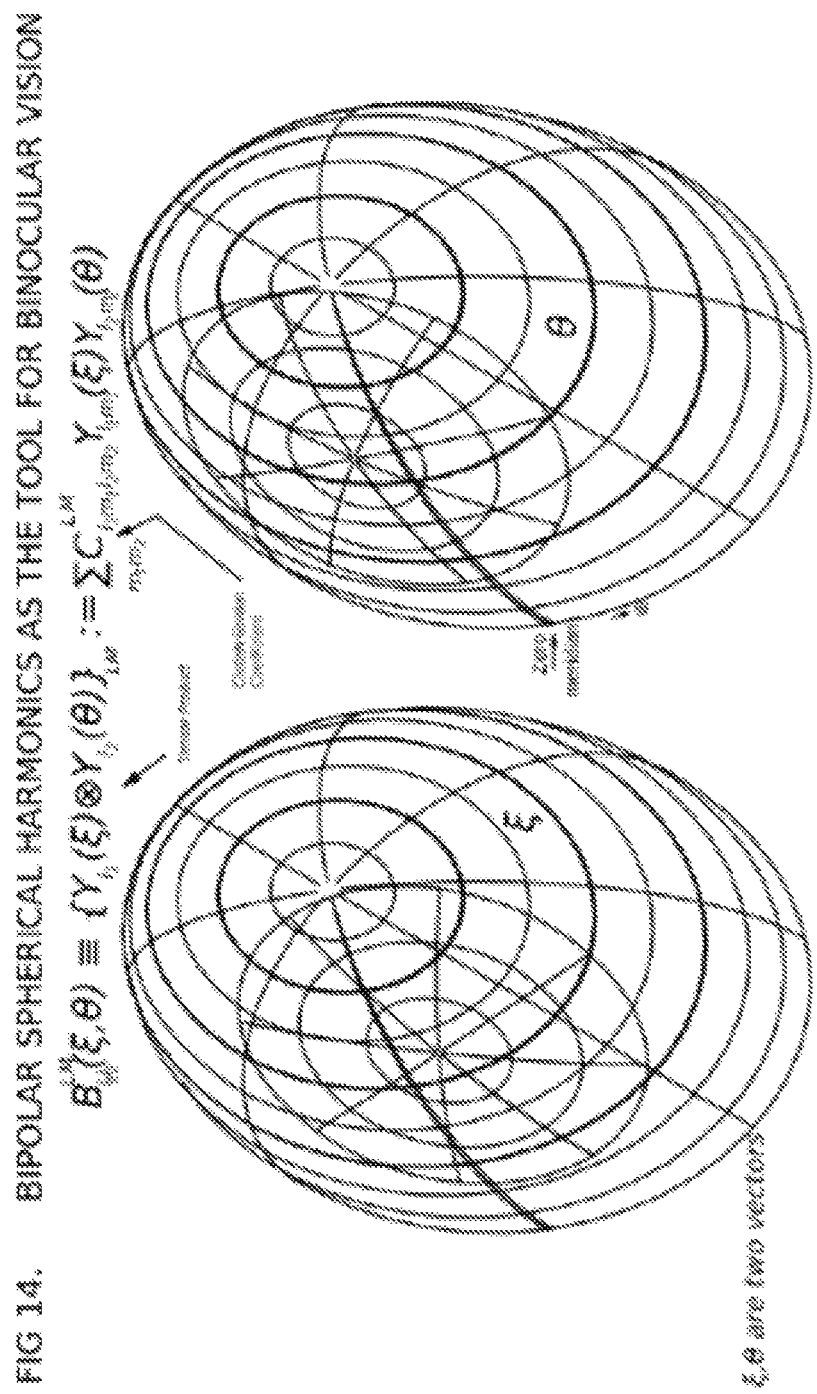
FIG. 14 discloses bipolar spherical harmonics as a tool for binocular vision.

Many technical applications will benefit from a competent Binocular Vision system, examples of which are disclosed in Bipolar Spherical Harmonics (BiPoSH) formula [16] and in FIG. 14. It will be understood that the Binocular Vision requires two independent visual channels.

The BiPoSH (from here on, subscript 1 will refer to one visual channel and subscript 2 to the second visual channel) are expressed as:

$$\mathfrak{B}_{l_1l_2}{}^{LM}(\xi,\theta)=\{Y_{l_1}(\xi)\otimes Y_{l_2}(\theta)\}_{LM}:=\Sigma_{m_1m_2}$$
$$\mathfrak{C}_{l_1m_1l_2m_2}{}^{LM}Y_{l_1m_1}(\xi)Y_{l_2m_2}(\theta) \quad [16]$$

Where:
$\otimes$ is a tensor product in Hilbert Space of Spherical Harmonics
$\|\xi\|=\|\theta\|=1.0$ are two unit vectors on 2-hemisphere(s) and
$-l_1 \leq m_1 \leq l_1$
$-l_2 \leq m_2 \leq l_2$ and
$\mathfrak{C}_{l_1m_1l_2m_2}{}^{LM}$ are Clebsh-Gordan coefficients. Available C++ program may be used to compute these.

The conditions for Clebsh-Gordan coefficients being non-zero:

$$M=m_1+m_2 \text{ and}$$

$$\|l_1-l_2\| \leq L \leq l_1+l_2$$

Bipolar Spherical Harmonics constitute an orthonormal basis on $\mathbb{L}_2(\mathbb{S}^2 \times \mathbb{S}^2)$ and therefore any function:

$$f(\xi,\theta) \in \mathbb{L}_2(\mathbb{S}^2 \times \mathbb{S}^2),$$

can be expanded into a series of Bipolar Spherical Harmonics:

$$f(\xi,\theta)=\Sigma l_1 l_2 LM g_{l_1l_2LM} \mathfrak{B}_{l_1l_2}{}^{LM}(\xi,\theta) \quad [17]$$

$g_{l_1l_2LM}$ are expansion coefficients of binocular image in a series of Bipolar Spherical Harmonics.

$$g_{l_1l_2LM}=\int_{\mathbb{S}^2}\int_{\mathbb{S}^2}f(\xi,\theta)\mathfrak{B}_{l_1l_2}{}^{LM}(\xi,\theta)d\xi d\theta \quad [18]$$

$$g_{l_1l_2LM}=\mathfrak{A}_{l_1l_2}{}^{LM}=\Sigma_{m_1m_2}<\alpha_{l_1m_1}\alpha_{l_2m_2}*>(-1)^{m_2}\mathfrak{C}_{l_1m_1l_2-m_2}{}^{LM} \quad [19]$$

Where: $\alpha_{l_1m_1}$ is an expansion coefficient in a series of Spherical Harmonics for monocular vision from left or right channel, and $<\alpha_{l_1m_1}\alpha_{l_2m_2}*>$ is an inner product in the functional (Hilbert) vector space of Spherical Harmonics.

The quantity we need, is here:

$$\mathfrak{J}_L=\Sigma_{M=-L}{}^{-L}\mathfrak{A}_{l_1l_2}{}^{LM}\mathfrak{A}_{l_1l_2}{}^{*LM} \quad [20]$$

It is a one-dimensional Bipolar Rotational Invariant marked by the index L. Construction of the multi-invariants for binocular vision involves using two web-cams or two photo-cameras separated by a known distance (d) and pointed in approximately the same point in space. The computed invariants will follow this protocol.

First, monocular expansion coefficients will be computed. Then, simultaneously invariants will be computed for each monocular side and the binocular invariants according to formulas [19] and [20]. The monocular invariants will be handled by one Librarian and will be stored in one Library, but the binocular invariants will need their special Library with connections preserved between the binocular invariants and corresponding monocular ones. Some technical systems may employ three channels working in concert. The mathematical description for such systems will be Tripolar Spherical Harmonics (see Reference [1]) which are constructed analogously.

Distance estimation to the outside objects can be easily done with the described vision system. First, a rough estimation can be done by taking into account how many spherical rectangles it took to construct a particular rotational invariant. The second, more accurate, method is to calculate the vectorial difference between multi-invariants for the left and right visual monocular channels. When the viewed object is remote, the difference must be small, when the object is close, the difference will increase proportionally. And, thirdly, a comparison of some components of binocular invariants with corresponding monocular ones from both channels will afford another estimate of the distance to the objects.

As explained above with respect to FIGS. 1-14, the example embodiments for the construction and evolution of invariants to rotational and translational transformations for electronic visual image recognition discussed herein include descriptions of steps that may be taken to compute invariants to rotational and translational transformations of fragments of the visual images projected on a hemisphere. The expression for computing invariants involves computing these coefficients (Gauss-Legendre Transform) first:

$$f_l^m = \Sigma_{j=1}^{N_0} f_m(\theta_j) P_l^m(\cos \theta_j) w_j \qquad [21]$$

It can easily be seen that it is a 2-D system. The expression [21] is a discrete approximation of integral expression [4] above. Computationally, a number $N_0$ is selected first. This number determines the sampling frequency along the meridians and therefore the visual acuity (resolution) in that direction. In the design of the invariant computations presented in the above, this sampling is done in small spherical rectangles first. A necessary component for computing coefficients in [21] are Fourier coefficients that are also computed via discrete sampling but in perpendicular direction, along the parallels with the distance from the North Pole determined by angles $\theta_j$. The latter are in turn determined by the position of the small spherical rectangle in respect to the North Pole and the method integration used. A number of numerical quadrature methods can be chosen to compute coefficients [21], e.g. Gauss-Legendre quadrature or Chebyshev quadrature. If Gauss-Legendre quadrature is chosen for numerical integration in the meridional direction then angles $\theta_j$ are zeroes of Legendre Polynomials $P_l^0$. There exist tables with the values of angles $\theta_j$ in radians, as well as the weights $w_j$, e.g. [4].

Figure 15:
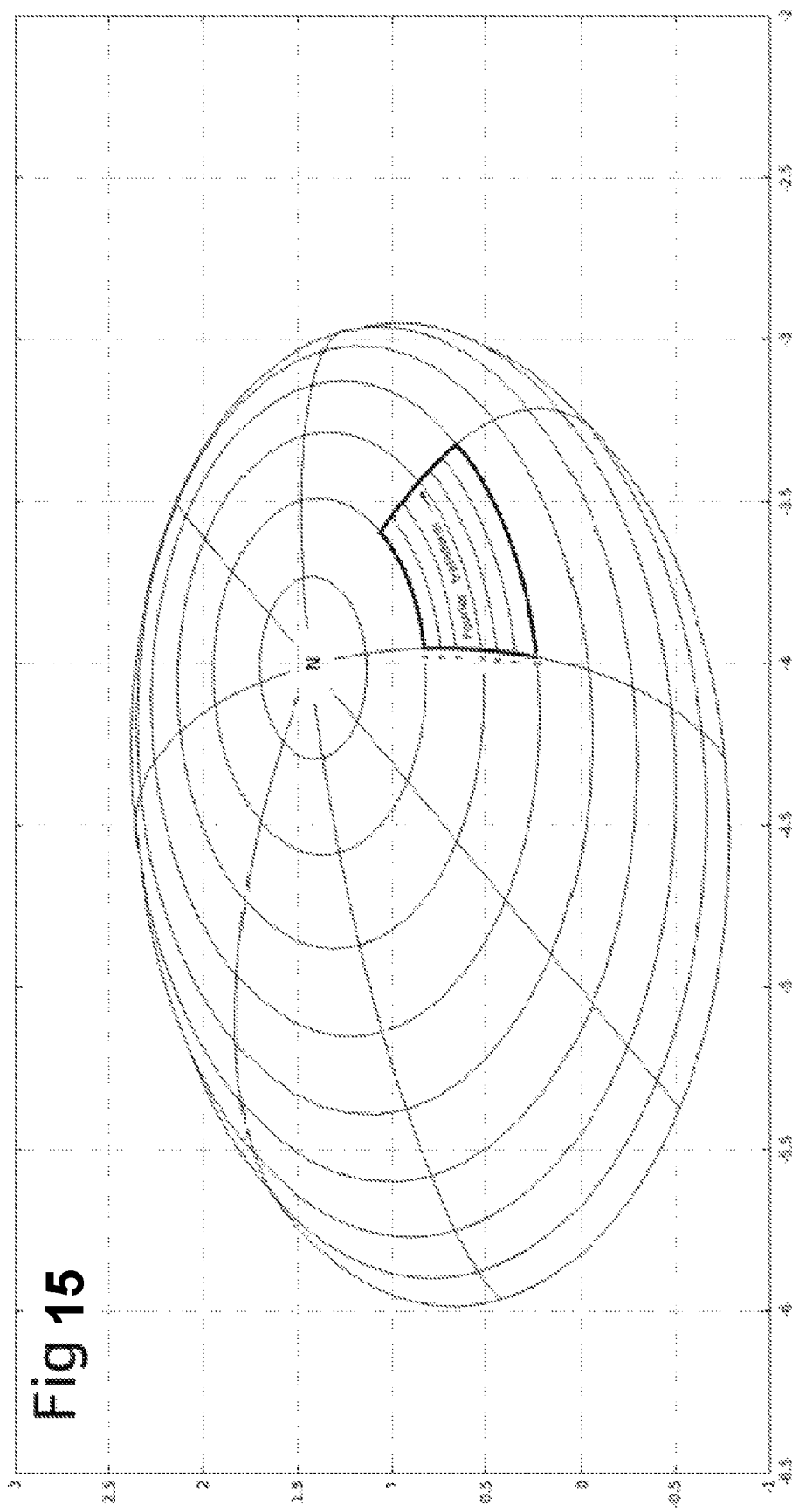
FIG. 15 discloses an example configuration of small spherical rectangles on a virtual 2-D hemisphere with an example of Fourier coefficients that may be computed in a perpendicular direction, along the parallels from the North Pole of the hemisphere.

The situation is illustrated in FIG. 15. There is a virtual hemisphere with the North Pole marked "N." A part of the hemisphere is represented by a spherical rectangle delineated meridionally between parallels 2 & 4 and azimuthally between meridians 3 & 4. Meridian 4 is partially hidden between the North Pole and parallel #2. It is assumed that the visual scene is projected virtually on this hemisphere. The Fourier Transform is computed along the fragments of parallels a, b, c, d, e, f, g whereas parallel a & g coincide with the northern and southern boundaries of the spherical rectangle.

Computationally, the Fourier coefficients $f_m(\cos \theta_j)$ are computed first, before coefficients of the full Gauss-Legendre transform are computed. Index m here is determined by the need to provide optimal visual acuity (resolution) at certain spherical distance from the North Pole. An invariant is proposed, computed from the set of the coefficients $f_m(\cos \theta_j)$ that is expected to provide useful information about the environment the system is observing. The formula to compute the invariants is:

$$I(\theta_j) = \Sigma_{m=M_0}^{M_1} f_m(\theta_j) f_m^*(\theta_j) \qquad [22]$$

The summation in [22] goes over index m from some low value $M_0$ which is not necessarily equal 0. The whole sequence of indexes m is not necessarily a segment of the set of natural numbers. The starting index $M_0$ and the last index $M_1$ are determined by considerations as described above and are chosen to provide optimal visual acuity at that particular band of the Hemisphere. There might also be gaps between the sequence of the m indexes in the sense that the difference between neighboring indexes $m_{i+1} - m_i$ may not be equal to 1. The numbers [22] are invariant to the motion of one-dimensional slice of the image along the parallel in East or West direction.

Figure 16:
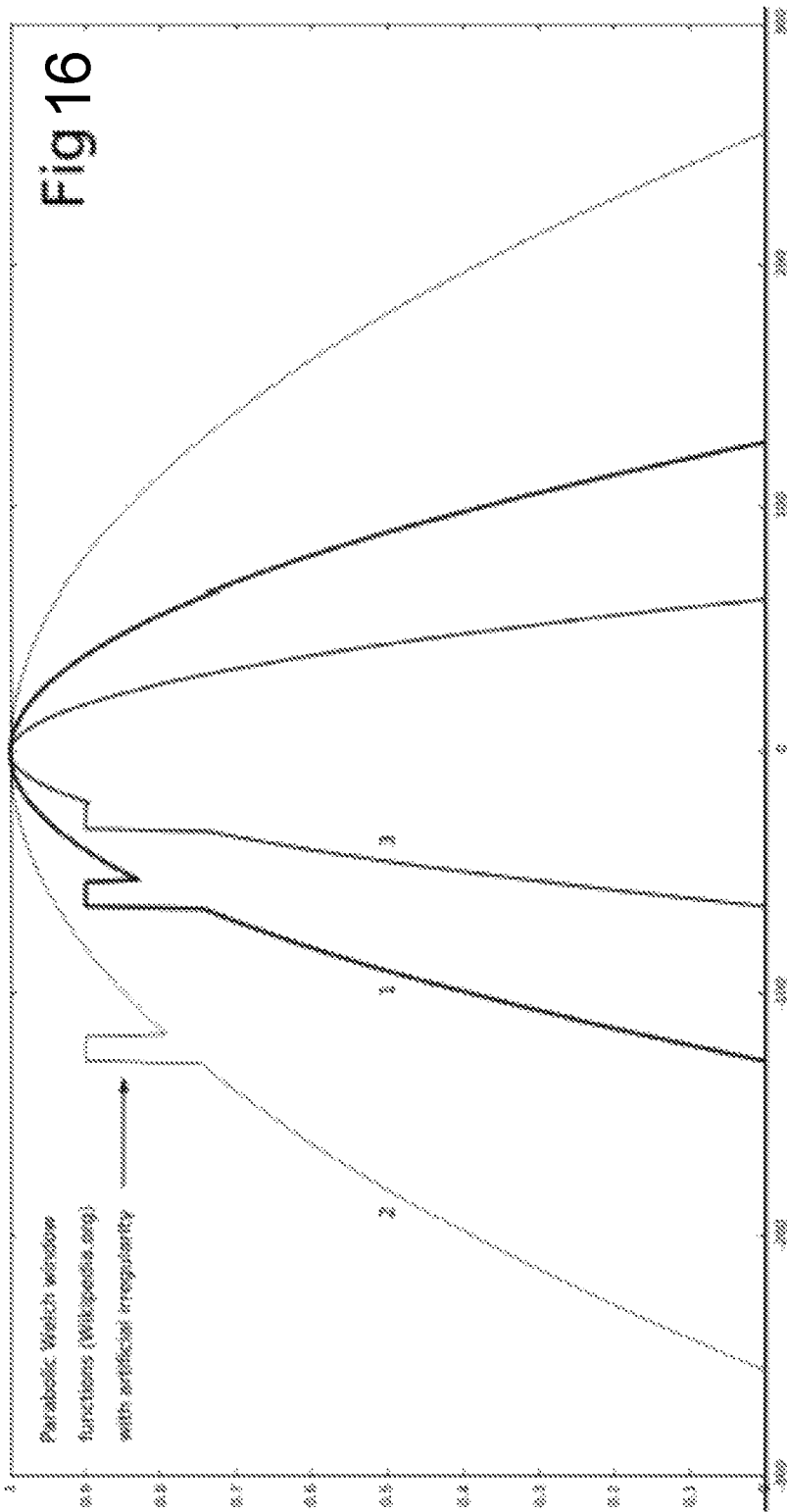
FIG. 16 discloses a graphic representation of an example of obtaining and using information computed in accordance with the example of FIG. 15.

In the examples of FIGS. 1 through 14, it was made clear that the invariants of the visual scene are computed within small time quanta, with one possible value may be 100 msec. It is illustrated in FIG. 16 that portions of the visual scene can be quickly evaluated by computing expressions [22] along the parallels or parts thereof to determine if the object moved during the transition from one quantum to the next. The time slice has been defined in above discussion as having one possible value of 100 milliseconds although other values may be also implemented depending on the available technology. Let's assume we have a sequence of time quanta $t_0, t_1, \ldots t_n$, and the visual scene was evaluated during the first slice $t_0$, invariants [8] (monocular or [20] (binocular) are computed and compared to the library of invariants thus providing a description of the visual scene at hand. In the process of computing invariants, the expressions [22] could be easily computed and stored. They will work as rather temporary, provisional markers for the portions of the environment. If during computation of the invariants for the next time quantum the corresponding simplified expressions [22] are computed as well and found not to have changed that will be taken into account by the decision making part of the program that it is a stationary object. If the object is not stationary and perhaps moving to the observer or away, that information will also be available computationally.

FIG. 16 shows how this information can be obtained and used. The diagram shows graphic representation of so called Parabolic Welch Window (see Wikipedia.org, article Window Function). An additional irregularity has been introduced to make the demonstration more realistic. In a symbolic way, the curve #1 could be assumed to represent an object in front of the visual system in question and is perhaps projected on one of the spherical rectangles or part thereof in parallel direction. Curve #2 is the same Welch window but the axis X for this curve has been expanded by the factor of 2. This curve may be interpreted as a contour of the object described by the curve 1 but the one that has moved closer to the observer. Curve 3 on the other hand is computed on the assumption that the contour #1 moved away from the observer and its angular size is narrower (smaller) now. The discrete Fourier transform for each curve has been done and the expression [22] computed. Here are the results:

$$I_1 = 1.47173 \text{(original)} \quad [23]$$

$$I_2 = 1.51541 \text{(widened by 2)} \quad [24]$$

$$I_3 = 1.4302 \text{(shrunk by 0.5)} \quad [25]$$

It can be seen that the invariant computed according to formula [22] increases when the object approaches the observer and becomes smaller when the object moves away. Thus, the numbers computed according to formula [22] in various time slices can be used for the first initial estimate of dynamics of the environment.

The monitoring visual recognition system can save time by evaluating these simplified invariants. If the numbers [23] remains unchanged from one time slice to the next, then the system can assume that this part of the visual scene has been stationary during transition from time quantum $t_i$ to $t_{i+1}$. If the invariant $I_1$ began to grow then the system can assume that this part of the environment is coming toward the observer, or observer is moving toward the former. Such computations might be especially valuable to assess the situation on the periphery of the visual scene.

Computation of such invariants is appealing because of simplicity but they are not enough to perform as vectors in library of invariants to act in the process of visual recognition. For that complete 2-D invariants (the formulas set forth at [8] and [12]-[14] above) are necessary.

Figure 17:
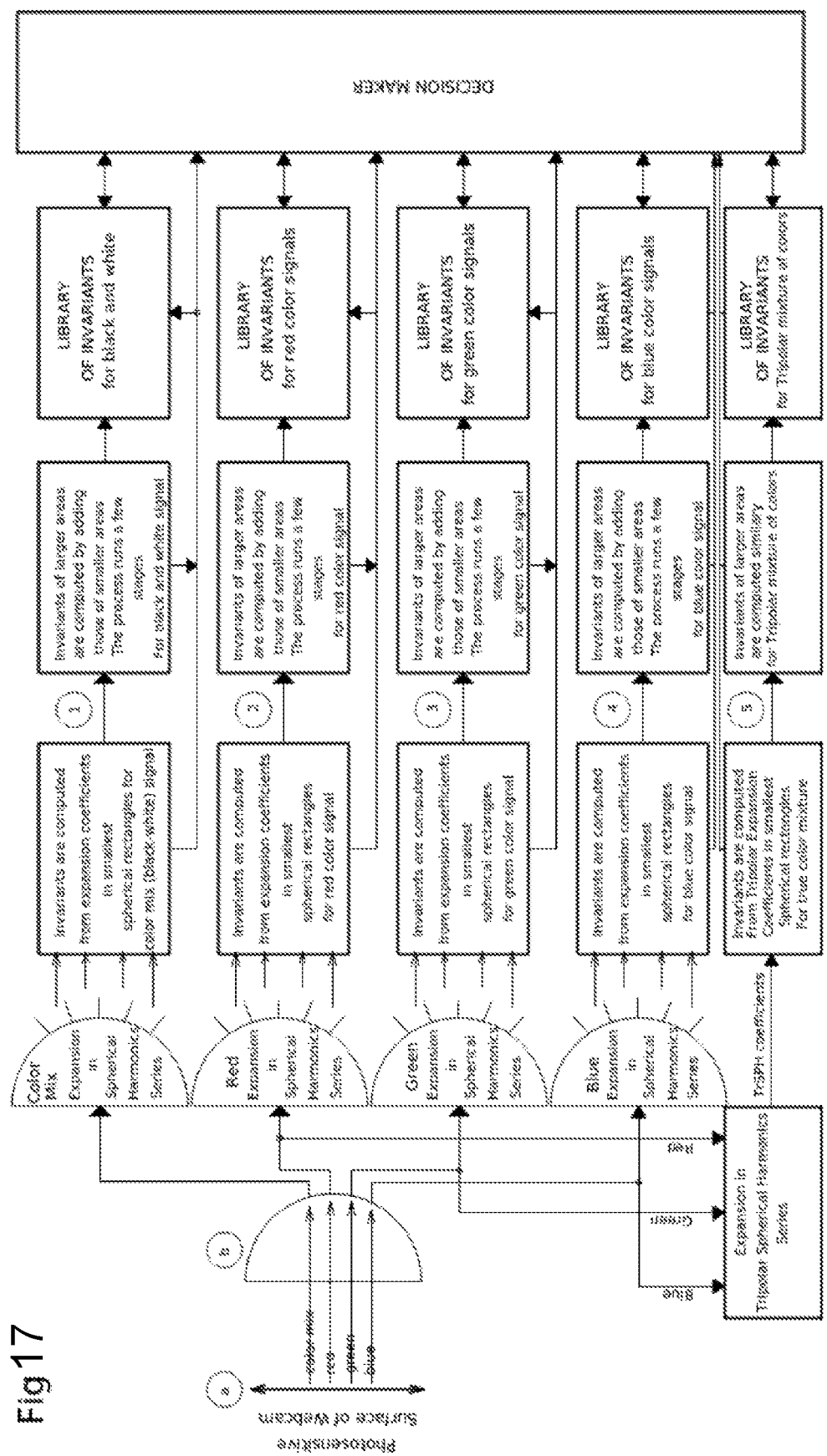
FIG. 17 is a flow diagram disclosing internalized computational environment shaped to perform operations for an efficient image recognition system which utilizes color perception.

Turning to FIG. 17, which illustrates the concept in structural terms, it may be advantageous for a system in accordance with the present disclosure to handle colors. Specifically, where it is able to name colors, especially where it is done in human terms: red, green, blue, etc. Such a system should be able to handle pure colors as well as their various mixtures. Color information processing can be easily and naturally incorporated in the framework of computer vision described in U.S. Pat. Nos. 8,670,621 and 9,727,945, the disclosures of which are incorporated by reference herein.

Color perception in many mammals including humans is based on breaking the visible spectrum into three areas with different but overlapping wavelength distributions. Color perceptions are represented in the human visual cortex, perhaps the highest level of analysis, spatially separated by color and probably separated from black and white. A system in accordance with the present disclosure may similarly use three separate channels built on the same principle of computing "color" invariants first in the small spherical rectangles and then aggregating them into larger areas with one of the channel devoted to red, another to green and the third to blue part of the spectrum. A fourth channel may be used to process a mixture thereof to represent black and white information with better shape descriptions.

The separation of electronic signals into the codes for all three colors can be done at the webcam level with a C++ code or by using a suitable Windows API, or as is otherwise known in the art. Representation of color perception mathematically on the level of the highest integration can be accomplished by using Tripolar Spherical Harmonics which are tensor products of regular spherical harmonics. These functions are widely used in Cosmic Microwave Background (CMB) research and Quantum Theory of Angular Momentum.

Turning to FIG. 17, the input is shown as a flat surface of the webcam marked as "a" inside a small circle. The image signals are then taken to the computer where the flat image is projected on a virtual hemisphere marked by letter "b" in a small circle. The next column has five semicircles (hemispheres) each devoted to different color signals or their combinations. The top row marked by number "1" in a small circle represents the channel for processing of color mixtures which for all practical purposes correspond to black and white signal. This part of the flow chart diagram corresponds to the flow chart diagram depicted in FIG. 1.

Rows 2-4 represent separate rows (channels) for processing separate colors: red, green and blue. The last row (5) represents the process of obtaining expansion coefficients into Tripolar Spherical Harmonics series whereas separate color signals are combined together to form a tensor product and subsequently compute Expansion Coefficients into the series of this tensor orthonormal space.

Theoretical Considerations—

Tripolar Spherical Harmonics are defined as a tensor product of three ordinary Spherical harmonics [1]:

$$\{Y_{l_1}(\theta_1\varphi_1) \otimes \{Y_{l_2}(\theta_2\varphi_2) \otimes Y_{l_3}(\theta_3\varphi_3)\}l_{23}m_{23}\}_{LM} = \Sigma_{m_1 m_2 m_3 m_{23}} C_{l_1 m_1 l_{23} m_{23}}^{LM} C_{l_2 m_2 l_3 m_3}^{l_{23} m_{23}} \times Y_{l_1 m_1}(\theta_1\varphi_1) Y_{l_2 m_2}(\theta_2\varphi_2) Y_{l_3 m_3}(\theta_3\varphi_3) \quad [26]$$

where functions $Y(\Omega)$ are spherical harmonics and scalars C are Clebsch-Gordan coefficients. This formula is good for computing the tensor product.

Integers L, $l_1$, $l_2$, $l_3$ and $l_{23}$ have such limitations:

$$0 <= L < \infty \text{ and} \quad [27]$$

$$-L \leq M \leq L; \quad [28]$$

$$-l_1 <= m_1 <= l_1; \quad [29]$$

$$-l_2 <= m_2 <= l_2; \quad [30]$$

$$-l_3 <= m_3 <= l_3; \quad [31]$$

$$-l_{23} <= m_{23} <= l_{23} \quad [32]$$

$$L = l_1 + (l_2 + l_3)l_{23} \quad [33]$$

$$L = l_3 + (l_1 + l_2)l_{12} \quad [34]$$

$$L = l_2 + (l_1 + l_3)l_{13} \quad [35]$$

Relation [33] is chosen here. In formula [27] summation runs according to formulas [29]-[32].

Tripolar Spherical Harmonics form a complete orthonormal basis for functions that depend on 3 vectors $|r_1|=1$; $|r_2|=1$; $|r_3|=1$ on 2-sphere.

Expansion of color pictures projected on 2-hemisphere is done this way. We can assume that vector $r_1$ is a vector describing red, vector $r_2$ is a vector describing green and vector $r_3$ is a vector describing blue. Then the expansion of a color function $\xi(r_1, r_2, r_3)$ will take this form:

$$\xi(r_1, r_2, r_3) = \Sigma_{l_1 l_2 l_3 l_{23}} B_{LM}^{l_1 l_2 l_3 l_{23}}(R) \times \{Y_{l_1}(\theta_1\varphi_1) \otimes \{Y_{l_2}(\theta_2\varphi_2) \otimes Y_{l_3}(\theta_3\varphi_3)\}l_{23}m_{23}\}_{LM} \quad [36]$$

where R represents 3 vectors $r_1$ $r_2$ and $r_3$ and the functions $Y(\Omega)$ are normalized spherical harmonics and B are complex-valued expansion coefficients of the function depending on three unit vectors on 2-sphere.

An explicit expression for the expansion coefficients is given here:

$$B_{LM}^{l_1 l_2 l_3 l_{23}}(r_1, r_2, r_3) = \int_0^{2\pi} \int_0^{\pi} \sin\theta_1 d\varphi_1 d\theta_1 \int_0^{2\pi} \int_0^{\pi} \sin\theta_2 d\varphi_2 d\theta_2 \int_0^{2\pi} \int_0^{\pi} \sin\theta_3 d\varphi_3 d\theta_3 \times \xi(r_1, r_2, r_3) \times \{Y_{l_1}(\theta_1\varphi_1) \otimes \{Y_{l_2}(\theta_2\varphi_2) \otimes Y_{l_3}(\theta_3\varphi_3)\}l_{23}m_{23}\}_{LM} \quad [37]$$

Where $\xi(r_1, r_2, r_3)$ is a real valued function on 2-sphere depending on 3, not necessarily linearly independent, vectors.

Rotational Invariants—

The rotational invariants of the three-prong function can be computed this way.

$$\mathfrak{I}_L = \Sigma_{M=-L}{}^L B_{LM}{}^{l_1 l_2 l_3 l_{23}} \times B_{LM}{}^{l_1 l_2 l_3 l_{23}*} \quad [38]$$

where asterisk denotes complex conjugate. Rotational invariants $\mathfrak{I}_L$ are real numbers. It can be seen that the possible number of invariants may be quite large if L is not too small. Those mono-invariants will, in combination, be acting as coordinates of multi-vectors in Euclidian space $\mathbb{R}^L$ of color invariants.

Computational Considerations—

Numerical integration will replace the Integrals in formula [37]. The computation of the expansion coefficients boils down to computing triple products of spherical harmonics with different integer indexes $m_1$ $m_2$ $m_3$ $m_{23}$ as in formula [26], running the ranges denoted in formulas [29]-[32].

It will be appreciated that the computation of "color" invariants is done locally (in small areas) and subsequently invariants are aggregated in larger and larger areas as described previously herein in connection with FIGS. 1 through 16. FIG. 17 illustrates these concepts in structural terms. Once the individual color signals (red, green and blue) had been used to compute the separate color expansion coefficients (shown in semi-circles in FIG. 17) they are moved to the next stage represented in FIG. 17 by the first column of rectangles. At the next stage represented by the second column of rectangles the invariants computed in small spherical areas, are aggregated to form rotational (and translational) invariants in larger and larger areas. Each time a search is done in the corresponding library to determine if the invariants in question represent a new object or an object already categorized in the past and only needed to be named.

Combination of color processing channels from two webcams positioned in such a way that they observe scenery in a manner similar to a pair of human eyes can easily be construed as providing a foundation for calculating binocular color vision invariants through tensor products. The combination of formula [16] with the flow chart diagram in FIG. 17 explains the design. The formula [16] will now be interpreted herein (in the color domain) as one of a triple. Each member of the triple will serve a different color component of the image: red, green or blue. Spherical Harmonics with subscript $l_1$: ($Y_{l_1 m_1}(\xi)$) will represent one color image component (e.g. red) but of the left webcam whereas the Spherical Harmonics with subscript $l_2$: ($Y_{l_2 m_2}(\theta)$) will represent the same color image component (e.g. red) but from the right webcam. The corresponding signals are taken from the hardware and software meaningful points represented in FIG. 17. Formula [20] will be now understood as providing a rotational (or translational) invariant for one of the color components of the image (red, green or blue). Separate libraries for three color invariants are needed herein.

The following references referred to in this disclosure are incorporated herein in their respective entireties by this reference: [1] D. A. Varshalovich, A. N. Moskalev, V. K. Khersonskii, *Quantum Theory of Angular Momentum*, World Scientific Publishing Co, Pte. Ltd 1989; [2] Sergey Kazantsev, *Singular value decomposition for the cone-beam transform in the ball*, Sobolev Institute of Mathematics, Novosibirsk, Russia; [3] Nidhi Joshi, Aditya Rotti, Tarun Souradeep, *Statistics of Bipolar Representation of CMB maps*, Centre for Theoretical Physics, India; [4] Pavel Holoborodko, Numerical integration. http://www.holoborodko.com/pavel/numerical-methods/numerical-integration/, as archived Oct. 13, 2016; [5] Istvan Szapudi, Wide Angle Redshift Distortion Revisited, The Astrophysical Journal 614:51-55, 2004; [6] D. J. Rowe and C. Bahri, Clebsch-Gordan coefficients of SU(3) in SU(2) and SO(3) bases. Journal of Mathematical Physics 41, 6544 (2000); and [7] C. Bahri, D. J. Rowe, J. P. Draayer, Programs for generating Clebsch-Gordan coefficients of SU(3) in SU(2) and SO(3) bases, Computer Physics Communications 159 (2004) 121-143.

E. Example Computing Devices and Associated Media

The embodiments disclosed herein may include the use of a special purpose or general-purpose computer or a server including various computer hardware or software modules, as discussed in greater detail below. A computer or a server may include a processor or multiple processors thus affording parallel computing capabilities, and computer storage media carrying instructions that, when executed by the processor and/or caused to be executed by the processor, perform any one or more of the methods disclosed herein. An external database system exemplified by Microsoft SQL Server or Oracle Database or, alternatively, a simplified database system designed specifically for the processes disclosed herein may be part of one of the embodiments of the invention.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer provided this storage media can operate at adequate read/write speeds.

By way of example, and not limitation, such computer storage media can comprise hardware such as solid state disk (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system or a server to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or a server, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein. In terms of computing environments, embodiments of the invention can be performed in client-server environments, whether network or local environments, or in any other suitable environment. Suitable operating environments for at least some embodiments of the invention include network computing environments.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of performing electronic visual image recognition, the method comprising:
    gathering data concerning a visual image; projecting the visual image on a virtual hemispherical surface and processing the visual image in the span of a first time quantum, with a system to be made available immediately to resume processing the next visual image and calculating invariants in a subsequent time quantum in case of either static or dynamic environment it is facing;
    defining a small number of zones on the virtual hemispherical surface each characterized by a distance from the center of the virtual hemispherical surface, expected visual acuity and special selection of subsets of indexes defining Spherical Harmonics in each zone,
    defining a preloaded set of spherical harmonics corresponding to expected positions of the visual images on the virtual hemispherical surface and expected discrimination in circular zones of the expected positions where the visual images are located;
    selecting 'l' and 'm' indexes;
    fragmenting the spherical harmonics into a set of rectangular elements and associating an 'l' and 'm' indexes with each element;
    providing operational opportunity for computing invariants for each of the elements, using 'l' and 'm' values (l—marked invariants); combining l-marked invariants into one multi-invariant and storing the multi-invariant;
    comparing the invariants to a library of invariants to recognize a physical object in the visual image; and
    taking, or not taking, one or more actions based upon results of the comparison of the invariants to a library of invariants.

2. The method as recited in claim 1, wherein the visual image is an image of a physical environment.

3. The method as recited in claim 1, wherein providing operational opportunity for computing invariants for each of the elements comprises computing Fourier Transformations for invariants along fragments of parallels of the zones on the virtual hemispherical surface.

4. The method as recited in claim 3, further comprising evaluating the invariants during the first time quantum and then in the subsequent time quantum to determine if the invariants correspond to a stationary object.

5. The method as recited in claim 4, further comprising continuing to compute Fourier Transformations for invariants along the fragments of parallels of the zones for images taken in a succession of time quantums.

6. The method as recited in claim 1, wherein gathering data concerning a visual image; projecting the visual image on a virtual hemispherical surface and processing the visual image in the span of a first time quantum comprises projecting separate data for at least two colors in the visual image on separate virtual hemispherical surfaces corresponding to the colors and separately processing the data for each color.

7. The method as recited in claim 6, wherein projecting separate data for at least two colors in the visual image on separate virtual hemispherical surfaces corresponding to the colors and separately processing the data for each color comprises projecting separate data for three colors in the visual image on three separate virtual hemispherical surfaces corresponding to the three colors and separately processing the data for each of the three colors.

8. The method as recited in claim 7, further comprising projecting separate data for a black and white visual image on a fourth virtual hemispherical surface and separately processing the data for the black and white visual image in parallel to separately processing the data for each of the three colors.

9. The method as recited in claim 7, wherein the l index is higher for an element that is closer to the North Pole, and the l index is lower for an element that is farther from the North Pole.

10. The method as recited in claim 1, further comprising discarding invariants that do not meaningfully correspond through regular recurrence with a physical environment or physical object on which the visual image is based.

11. The method as recited in claim 1, wherein the set of spherical harmonics has an associated North Pole that is unique to that set and serving as a reference point.

12. A non-transitory storage medium having stored therein computer-executable instructions which, when executed by one or more hardware processors, implement and/or cause the implementation of the method of claim 1.

13. A physical vehicle configured to operate in a physical environment that is either static or dynamic, wherein a visual image is an image of the physical environment, and wherein the physical vehicle is a land-based vehicle or an amphibious land/sea vehicle which is configured to perform the method of claim 1 and wherein taking, or not taking, one or more actions based upon results of the comparison of the invariants to a library of invariants comprises controlling an action of the physical vehicle.

14. A system, comprising:
    a computing device including one or more hardware processors;
    a camera configured to gather data concerning a visual image, and the camera is configured for communication with the computing device;
    a non-transitory storage medium having stored therein computer-executable instructions which, when executed by the one or more hardware processors:
        projects the visual image obtained from the camera on at least a first imaginary hemispheric surface; and
        generates invariants, wherein the system is operable to separate data from the visual image by color and projects the visual image obtained from the camera on at least a first imaginary hemisphere by protecting individual visual images on a plurality of imaginary hemispheric surfaces corresponding to the color separation and separately processes the individual visual images by color to generate the invariants.

15. The system as recited in claim 14, wherein the system is further operable to separate black and white data from the visual image and project a black and white image on an additional imaginary hemisphere and separately process the black and white visual image in parallel to separately processing the individual visual images by color.

16. The system as recited in claim 14, wherein:
the camera is a webcam; and
the computing device is a dual processing device that comprises two processing channels, and the system further comprising:
an additional webcam,
wherein the system is operable to provide a binocular vision capability.

17. The system as recited in claim 14, wherein the system is operable to provide an accurate estimate of a distance from the camera to one or more outside objects.

18. The system as recited in claim 14, wherein the system is operable to compute invariants for the visual image by computing Fourier Transformations for invariants along fragments of parallels of zones on the imaginary hemispheric surface.

19. The system as recited in claim 14, wherein the system is operable to evaluate the invariants during a first time quantum and then in at least one subsequent time quantum to determine if the invariants correspond to a stationary object.

\* \* \* \* \*